(12) United States Patent
Kujirai et al.

(10) Patent No.: US 9,057,619 B2
(45) Date of Patent: Jun. 16, 2015

(54) OPTIMAL PATH SEARCH SYSTEM AND OPTIMAL PATH SEARCH METHOD

(75) Inventors: Toshihiro Kujirai, Kodaira (JP); Reiko Kubo, Tokyo (JP); Masahiro Kameda, Matsudo (JP); Yoriko Kazama, Hanno (JP); Takashi Watanabe, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 405 days.

(21) Appl. No.: 13/361,447

(22) Filed: Jan. 30, 2012

(65) Prior Publication Data
US 2012/0209512 A1    Aug. 16, 2012

(30) Foreign Application Priority Data
Feb. 10, 2011    (JP) .................................. 2011-027000

(51) Int. Cl.
*G01C 21/36* (2006.01)
*G01C 21/34* (2006.01)

(52) U.S. Cl.
CPC ............ *G01C 21/3423* (2013.01); *G01C 21/34* (2013.01); *G01C 21/343* (2013.01); *G01C 21/3453* (2013.01)

(58) Field of Classification Search
CPC .. G01C 21/34; G01C 21/3453; G01C 21/343; G01C 21/3423

USPC .......................................................... 701/428
See application file for complete search history.

(56) References Cited

U.S. PATENT DOCUMENTS

2004/0143560 A1 *  7/2004   Zhu ................................ 706/19

FOREIGN PATENT DOCUMENTS

| JP | 2003-106858 A | 4/2003 |
| JP | 2005-140664 A | 6/2005 |
| JP | 2005-288628 A | 10/2005 |
| JP | 2006-292447 A | 10/2006 |

* cited by examiner

*Primary Examiner* — John Q Nguyen
*Assistant Examiner* — Kyung Kim
(74) *Attorney, Agent, or Firm* — Mattingly & Malur, PC

(57) ABSTRACT

An optimal path search system, which optimizes a travel path of a moving object, comprising: a path information database; and a path search unit that searches for an optimal path that exhibits a minimum travel cost borne by the moving object, from among travel paths of the moving object, wherein: the path search unit is configured to: determine destination points on the path network; search for at least one nearest node to each of destination points, search for a second travel path along which the moving object travels by passing through the at least one nearest node and all of the at least one destination point, determine the second travel path for which a travel cost is minimum; and search for the travel paths followed by using each of a plurality of moving means, respectively, in a case where the moving object travels along the optimal path.

14 Claims, 21 Drawing Sheets

| | 901 | 902 | 903 | 900 |
|---|---|---|---|---|
| | NODE IDENTIFIER | CUMULATIVE TRAVEL COST | PATH | |
| | G | 9 | PATH 1 (L→G) | |
| | ⋮ | ⋮ | ⋮ | |

OPTIMAL PATH SEARCH SYSTEM AND OPTIMAL PATH SEARCH METHOD

CLAIM OF PRIORITY

The present application claims priority from Japanese patent application JP 2011-27000 filed on Feb. 10, 2011, the content of which is hereby incorporated by reference into this application.

BACKGROUND OF THE INVENTION

This invention relates to a technology for optimizing travel paths of a plurality of moving objects in order to carry out a predetermined task.

As a general method, a survey task for items of crops planted in farm fields is performed by a surveyor while searching for subject farm fields mainly depending on paper maps.

A car navigation system can be used for the above-mentioned survey task in an auxiliary manner, but part of farm roads, footpaths between farm fields, or the like are not normally registered in maps for the car navigation system. This is because it is harder to drive on a road having a predetermined width or smaller and it is therefore inappropriate for the car navigation system for general users to present the above-mentioned footpath or the like as the path.

Therefore, the car navigation system can be used by setting a vicinity of a survey subject farm field as a destination point, but after arriving at the destination point, the surveyor needs to search for the farm field depending on a paper map.

During the above-mentioned survey task, it is necessary to travel along a narrow farm road that is hard to pass through by car and a footpath that cannot be passed through by car, before reaching the survey subject farm field. Therefore, an optimization of a survey path is a optimization problem in consideration of a combination of traveling by automobile and traveling on foot.

As a solution to the above-mentioned problem, for example, there is known a technology for presenting an optimal path obtained by combining walking and traveling using public transportation (see, for example, JP 2003-106858 A). Further, there is known a method of searching for the optimal path in consideration of a station at which taxis and rental cars are available and a station at which taxis or rental cars are unavailable (see, for example, JP 2006-292447 A). With this method, it is possible to present a route for arriving at the destination earlier even after traveling a long distance as a result of using a taxi than a route for walking for a long time after getting off at the nearest station, and also possible to present a station at which the last train is late and taxis are available as a station to get off at instead of the nearest station.

In addition, there is known a technology for searching for the optimal path of each of a plurality of moving objects such as a walking person and an automobile in consideration of a case where a person traveling on the automobile gives a ride to the person traveling on foot on the way when the plurality of moving objects are heading from different departure points toward the same destination (see, for example, JP 2005-140664 A). Further, there is known a technology for searching for a travel path of a material handling robot for carrying medical materials such as medical supplies to a sickroom in place of a doctor or nurse (see, for example, JP 2005-288628 A).

SUMMARY OF THE INVENTION

However, with the technology disclosed in JP 2003-106858 A, travel schedules of the public transportation and the taxis are not optimized for the convenience of the users. Further, the description is directed only to the cases of calling a taxi at the departure point and riding the taxi at the station even in the case of using the taxis whose path can be changed in accordance with the convenience of the users, and is not directed to a search for the path that optimizes the traveling on foot and the traveling using the automobile. Further, in the same manner as the technology disclosed in JP 2003-106858 A, the technology disclosed in JP 2006-292447 A includes no description about an optimization of the travel schedule of the taxis.

Further, the technology disclosed in JP 2005-140664 A handles the same one destination point, and therefore cannot be applied to a survey task performed in farm fields while traveling between a plurality of destination points. Further, it is not possible to search for the optimal path along which the surveyor travels to a predetermined point by using a car and then gets off the car in order to perform a survey at a point that cannot be passed through by car.

Further, with the technology disclosed in JP 2005-288628 A, the doctor or nurse and the material handling robot have a plurality of destination points, but paths of both pass through the same destination points, and hence it is not possible to optimize the travel paths of the moving objects that travel along different paths. In other words, an object to be achieved by this invention is to provide a method and a system which are capable of searching for an optimal path for efficiently performing a predetermined task by combining a plurality of moving means in consideration of a plurality of types of moving means in a farm field survey, harvesting work, or the like.

The present invention can be appreciated by the description which follows in conjunction with the following figures, wherein: an optimal path search system, which optimizes a travel path of a moving object, comprising: a path information database; a path search unit that searches for an optimal path that exhibits a minimum travel cost borne by the moving object, from among travel paths of the moving object; and an output unit that outputs information regarding the retrieved optimal path. The path information database holds: path network management information for managing a path network that is structured of a plurality of nodes indicating points through which the moving object can travel and a plurality of links that connect between the plurality of nodes; and travel cost management information for managing travel costs, which is necessary to travel along each of the plurality of links by using each of a plurality of moving means for each of the plurality of moving means, each of the plurality of moving means is used to travel along each of the plurality of links. The plurality of nodes include at least one intersection node that can be reached by traveling along the plurality of links by using the plurality of moving means. The path search unit is configured to: determine at least one destination point on the path network; reference the path information database to search for a first travel path for traveling from the at least one destination point to the at least one intersection node, and calculate a first travel cost that is necessary for the moving object to travel along the retrieved first travel path; search for at least one nearest node to each of destination points, the at least one nearest node being the intersection node to which the calculated first travel cost is minimum; reference the path information database to search for a second travel path along which the moving object travels by passing through the at least one nearest node and all of the at least one destination point, and calculate a second travel cost that is necessary for the moving object to travel along the retrieved second travel path; determine the second travel path for which the calculated second travel cost is minimum as the optimal path; and reference the path information database to search for the travel paths followed by using each of the plurality of moving means, respectively, in a case where the moving object travels along the optimal path; and the output unit outputs data for displaying information regarding the optimal path and the travel paths of each of the plurality of moving means. It is possible to reduce a calculation amount while satisfying optimality of the travel paths to be searched for, and to determine the travel paths of the respective moving means so that the travel paths of the moving objects become optimal.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

Description is made of an optimal path search system according to a first embodiment, which searches for an optimal path obtained by combining traveling by automobile and traveling on foot in a case where a surveyor surveys farm fields such as paddy fields and dry fields. Hereinafter, the traveling by automobile is referred to as "automobile travel", and the traveling on foot is referred to as "foot travel".

Figure 1:
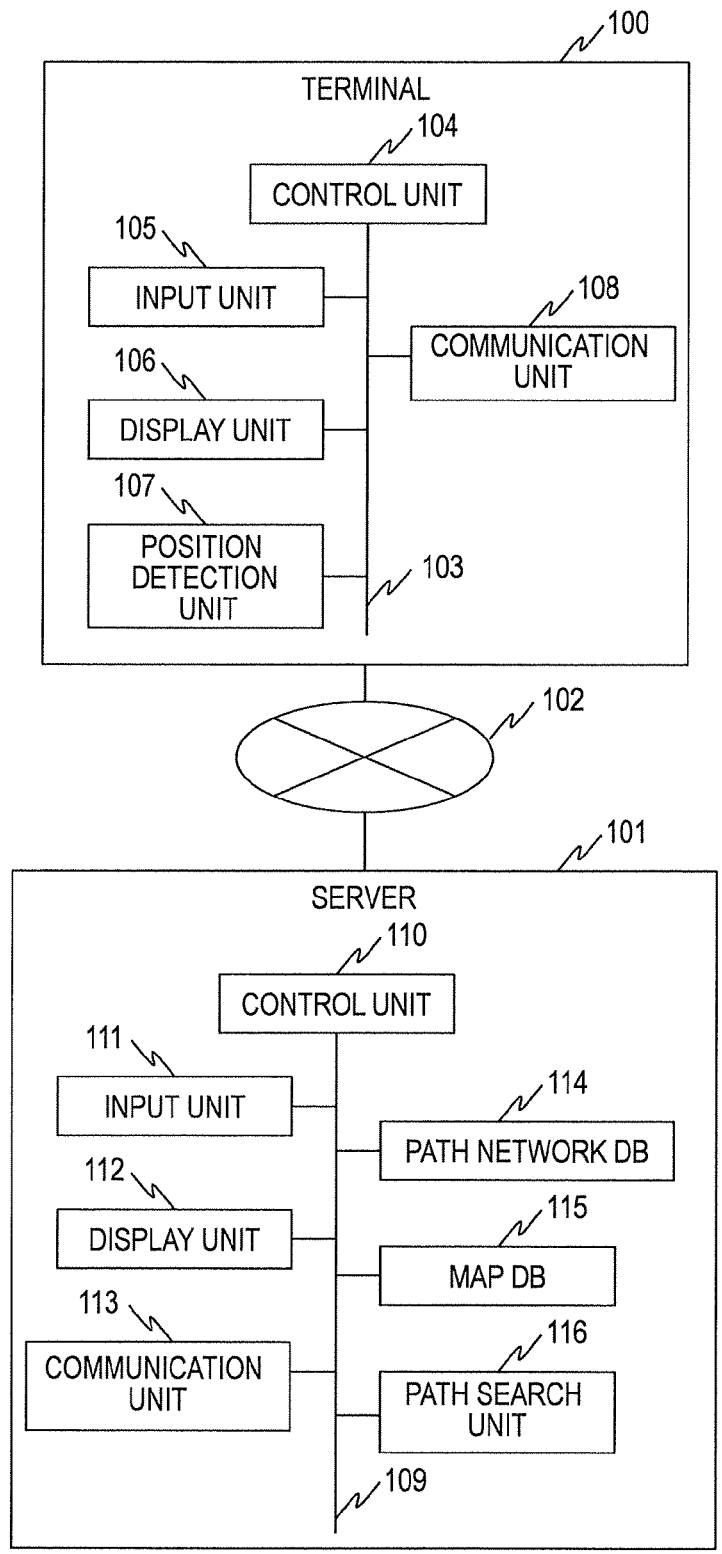
FIG. 1 is a block diagram illustrating an example of a configuration of an optimal path search system according to a first embodiment of this invention.

FIG. 1 is a block diagram illustrating an example of a configuration of the optimal path search system according to the first embodiment of this invention.

The optimal path search system according to the first embodiment includes a terminal 100 that is carried around by the surveyor, a server 101 that executes search processing for the optimal path, and a network 102 that couples the terminal 100 and the server 101 to each other. It should be noted that FIG. 1 illustrates one terminal 100 and one server 101, but the optimal path search system may include a plurality of terminals 100 and a plurality of servers 101.

The terminal 100 includes a control unit 104, an input unit 105, a display unit 106, a position detection unit 107, and a communication unit 108. The respective components are coupled to one another by a data communication bus 103. It should be noted that the terminal 100 may include another component.

The control unit 104 executes processing for implementing functions included in the terminal 100. The control unit 104 can be implemented by, for example, a processor.

The input unit 105 receives an information presentation request, a setting request for a path search condition, and the like from the surveyor. The input unit 105 can be implemented by buttons, a touch panel, and the like.

The display unit 106 displays information including a map image and path information for the surveyor. The display unit 106 can be implemented by, for example, a liquid crystal display.

The position detection unit 107 detects a current position of the terminal 100. The position detection unit 107 can be implemented by, for example, a global positioning system (GPS) or a self-contained navigation unit.

The communication unit 108 communicates with the server 101 via the network 102. Specifically, the communication unit 108 transmits information regarding the current position of the terminal 100, the information presentation request, the setting request for a path search condition, and the like to the server 101, and also receives a map image showing the periphery of the current position of the terminal 100, optimal path information, and the like from the server 101. The communication unit 108 can be implemented by a cellular phone network card, a WiMAX network card, or the like.

It should be noted that the respective components included in the terminal 100 may be implemented by using software. For example, the software that implements the respective components can be used as the terminal 100 by being introduced into an existing device such as a cellular phone, a smart phone, a portable game machine, a car navigation system, or a personal navigation device (PND).

Further, any form can be used for the terminal 100, and the terminal 100 that can be carried around by the surveyor while traveling on foot or the terminal 100 that can be installed in the automobile may be used.

The server 101 searches for an optimal farm field survey path (optimal path) obtained by combining the automobile travel and the foot travel, and transmits information regarding the retrieved optimal path to the terminal 100.

The server 101 includes a control unit 110, an input unit 111, a display unit 112, a communication unit 113, a path network DB 114, a map DB 115, and a path search unit 116. The respective components are coupled to one another by a data communication bus 109.

The control unit 110 executes processing for implementing functions included in the server 101. The control unit 110 can be implemented by, for example, a processor. Further, the control unit 110 includes a storage unit (not shown) for storing information necessary for the processing.

The input unit 111 is an interface for allowing an operator who operates the server 101 to operate the server 101. The input unit 111 can be implemented by, for example, a keyboard, a mouse, buttons, and a touch panel. The operator uses the input unit 111 to input latitude and longitude information or a node number within a path network and specify a place to which the surveyor is to travel for a survey. Hereinafter, the place to which the surveyor is to travel for a survey is referred to as "destination point".

The display unit 112 displays various kinds of information for the operator. The display unit 112 can be implemented by, for example, a liquid crystal display.

The communication unit 113 communicates with at least one terminal 100 via the network 102. The communication unit 113 transmits the information regarding the optimal path to the terminal 100, and also transmits a peripheral map image corresponding to the current position of the terminal 100 to the terminal 100. The communication unit 113 can be implemented by, for example, a network card.

The path network DB 114 stores information regarding the path network. Here, the path network is structured of nodes indicating geographic points and links that connect between the nodes. The path network includes information on roads that allow the automobile travel, farm roads that allow the automobile travel, footpaths that allow only the foot travel, and the like. The path network is described later by referring to FIGS. 2, 3A, and 3B.

The map DB 115 stores map images expressed in a raster format or a vector format. The map DB 115 stores, for example, 50-meter-mesh elevation data created by Geographical Survey Institute or the like. It should be noted that formats such as JPEG, PNG, and TIFF can be used for the map images.

Further, the map DB 115 stores the map images on a resolution basis, and stores the map images divided into zones. With this configuration, in a case where the current position of the terminal 100 changes, the server 101 can transmit the map image of an appropriate zone which has an appropriate resolution to the terminal 100. Therefore, a map corresponding to the current position is displayed on the terminal 100. It should be noted that scalable vector graphics (SVG) and the like can be used for the map images in the vector format.

The path search unit 116 searches for the optimal path for allowing the surveyor to most efficiently travel to all destination points, and outputs the information regarding the retrieved optimal path to the operator or the surveyor. In this embodiment, the optimal path obtained by combining the automobile travel and the foot travel is searched for.

Here, moving means include that a travel method by using on foot, and a travel method by using automobile. Further, the optimal path obtained by combining two moving means represents a path obtained by optimally determining a path to travel by using the automobile, a point to get off the automobile, a path to travel on foot, and a point to get on the automobile again. Hereinafter, the point within the optimal path to get on/off the automobile is referred to as "junction".

Figure 2:
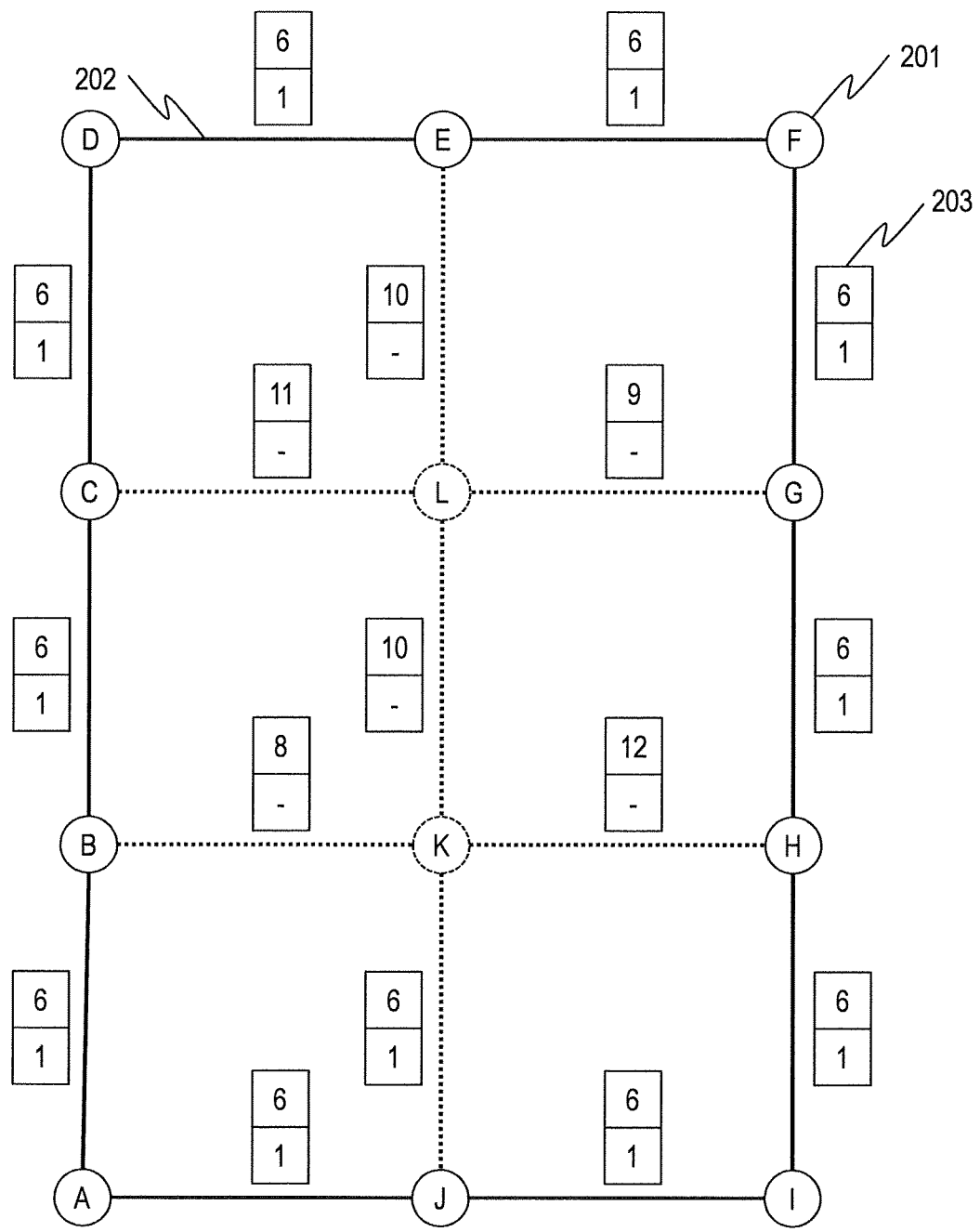
FIG. 2 is an explanatory diagram illustrating an example of a path network according to the first embodiment of this invention.

FIG. 2 is an explanatory diagram illustrating an example of the path network according to the first embodiment of this invention.

As described in FIG. 1, the path network is structured of a plurality of nodes 201 and a plurality of links 202. The nodes 201 represent points to which the surveyor can travel. The nodes 201 are each assigned an identifier that can uniquely identify the node 201 within the path network. It should be noted that in the following description, the nodes 201 are each assigned attribute information indicating whether or not the automobile travel is possible. Further, the links 202 are each assigned information (travel cost information 203) regarding travel times of the automobile travel and the foot travel.

Hereinafter, the travel times of the automobile travel and the foot travel are referred to as "travel costs". Further, the attribute information indicating whether or not the automobile travel is possible is referred to simply as "attribute information", and the information regarding the travel times of the automobile travel and the foot travel is referred to as "travel cost information 203".

In the example illustrated in FIG. 2, a node K 201 and a node L 201 represent the nodes 201 through which the automobile travel is impossible. In this embodiment, the node 201 through which the automobile travel is possible is expressed by using a solid circle, while the node 201 through which the automobile travel is impossible is expressed by using a dotted circle.

Further, hereinafter, of the nodes 201 that structure the path network, the nodes 201 that can be reached or passed by both the automobile travel and the foot travel are referred to also as "intersection nodes 201". In the example illustrated in FIG. 2, the node A 201 to the node J 201 are set as the intersection nodes 201.

The link 202 is a directed link, and can also express one-way traffic. However, in this embodiment, for the sake of simplicity, the description is made by taking as an example a case where the travel costs along the link 202 stay the same regardless of its travel directions, in other words, a case where the link 202 is a undirected link.

The travel cost information 203 stores the travel cost borne by each moving means within the link 202.

In the example illustrated in FIG. 2, the travel cost information 203 stores the travel cost of the automobile travel and the travel cost of the foot travel. Specifically, within the travel cost information 203, the upper row indicates the travel cost of the foot travel, and the lower row indicates the travel cost of the automobile travel.

It should be noted that the sign "-" set in the travel cost information 203 indicates that the traveling by the corresponding moving means is impossible. On a computer, the sign "-" can be expressed by providing a large value such as a maximum integer value as the travel cost.

Further, the link 202 may be assigned road type information indicating a type of road such as a general road, a farm road, or a footpath. In a case where the link 202 is assigned the road type information, a link with the travel cost of the automobile travel being "-" indicates that the link is assigned the road type information indicating "footpath".

It should be noted that in a case where the path network includes no attribute information, the node 201 through which the automobile travel is possible can be identified by using the following method.

The server 101 uses the travel cost information 203 of the automobile travel held by the link 202 to follow the nodes 201 in order from a predetermined start point by a depth-first search method. At this time, the server 101 assigns a mark indicating that the automobile travel is possible to the node 201 that has been followed once, and a search in a depth direction stops at a time when marks have been assigned. This allows identification of all the nodes 201 through which the automobile travel is possible from the start point. Therefore, it is not necessary for the path network to include the attribute information on the nodes 201.

FIG. 2 illustrates the path network that expresses roads around a typical farm field, which is divided into six farm fields by footpaths. As illustrated in FIG. 2, the travel cost borne in a case of traveling on foot along the link 202 (general road or farm road) along which the automobile travel is possible is lower than the travel cost in a case of traveling along a footpath.

In the example illustrated in FIG. 2, paths along which the automobile travel is possible and paths along which the foot travel is possible are expressed in one path network. However, the path network is not limited thereto, and may be held, for example, for each moving means.

Figure 3A:
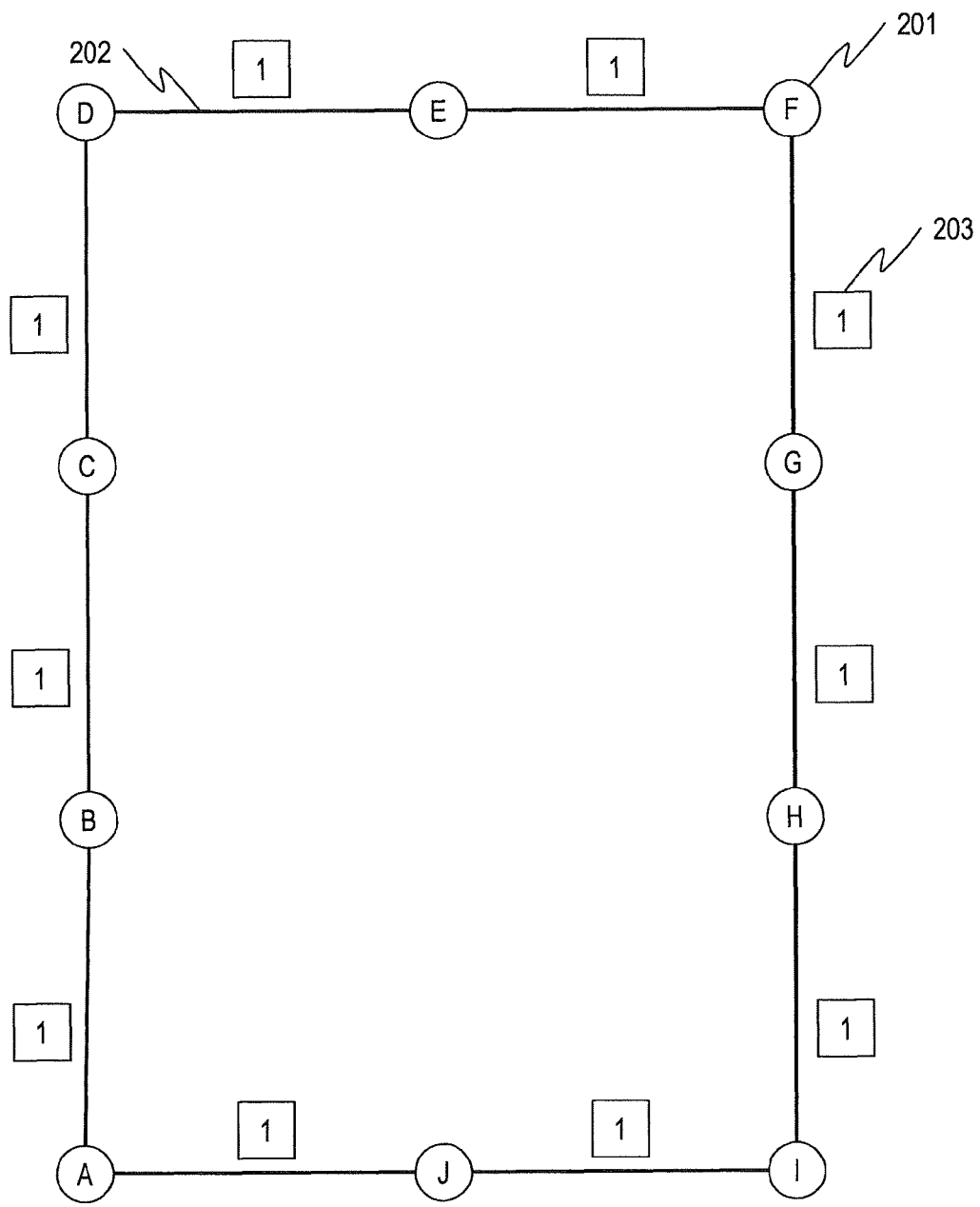
FIGS. 3A and 3B are explanatory diagrams illustrating other forms of the path network according to the first embodiment of this invention.
Figure 3B:
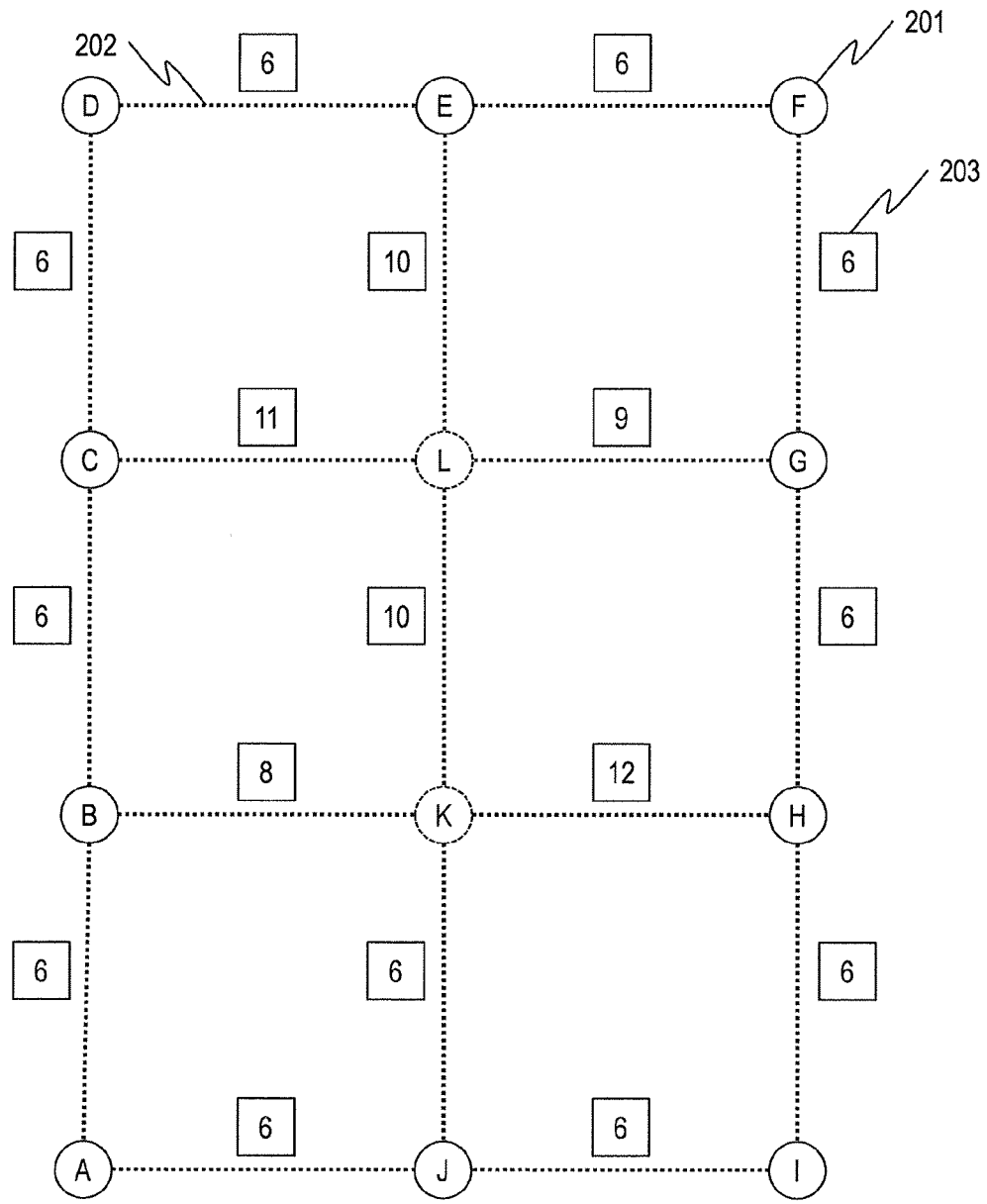

FIGS. 3A and 3B are explanatory diagrams illustrating other forms of the path network according to the first embodiment of this invention.

FIG. 3A illustrates the path network regarding the automobile travel, and FIG. 3B illustrates the path network regarding the foot travel. It should be noted that the node 201 having the same identifier within the respective path networks indicates the same point.

Next, description is made of a specific example of the information stored in the path network DB 114.

Figure 4A:
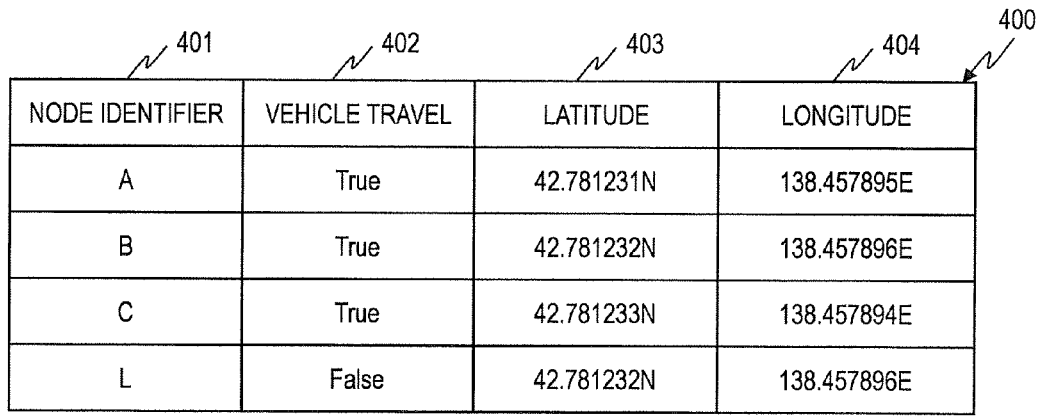
FIG. 4A is an explanatory diagram illustrating an example of a node information table stored in a path network DB according to the first embodiment of this invention.
Figure 4B:
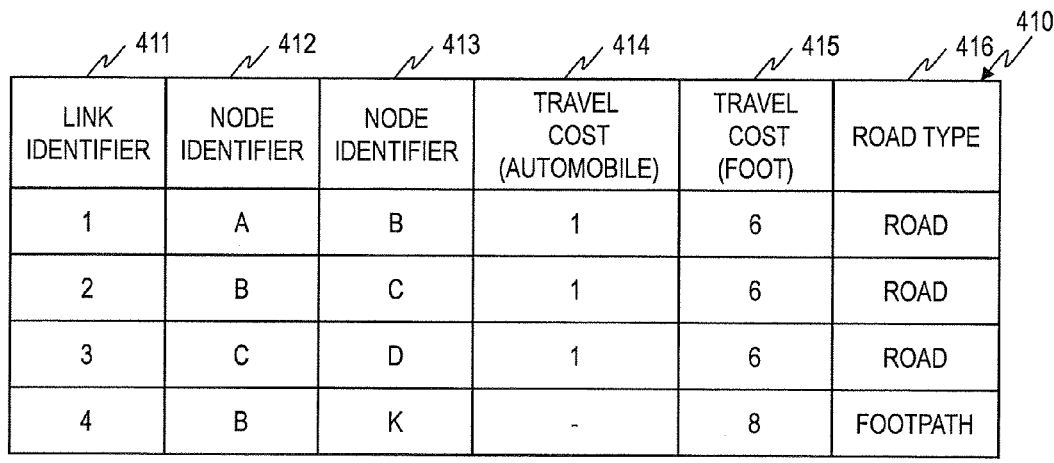
FIG. 4B is an explanatory diagram illustrating an example of a travel cost information table stored in the path network DB according to the first embodiment of this invention.

FIG. 4A is an explanatory diagram illustrating an example of a node information table 400 stored in the path network DB 114 according to the first embodiment of this invention. FIG. 4B is an explanatory diagram illustrating an example of a travel cost information table 410 stored in the path network DB 114 according to the first embodiment of this invention.

The node information table 400 stores management information on the nodes 201. The node information table 400 includes a node identifier 401, vehicle travel 402, a latitude 403, and a longitude 404.

The node identifier 401 stores an identifier for uniquely identifying the node 201.

The vehicle travel 402 stores information indicating whether or not the automobile travel is possible through the node 201 corresponding to the node identifier 401. In this embodiment, the value "True" is stored in the case where the automobile travel is possible, and the value "False" is stored in the case where the automobile travel is impossible.

The latitude 403 and the longitude 404 store the longitude and the latitude that indicate a position of the node 201 corresponding to the node identifier 401.

The travel cost information table 410 stores management information on the travel cost borne by each moving means within one link 202. The travel cost information table 410 includes a link identifier 411, a node identifier 412, a node identifier 413, a travel cost (automobile) 414, a travel cost (foot) 415, and a road type 416.

The link identifier 411 stores an identifier for uniquely identifying the link 202.

The node identifier 412 and the node identifier 413 store identifiers for uniquely identifying the nodes 201 that are connected by the link 202 corresponding to the link identifier 411.

The travel cost (automobile) 414 stores the travel cost borne in the case of traveling by using the automobile along the link 202 corresponding to the link identifier 411.

The travel cost (foot) 415 stores the travel cost borne in the case of traveling on foot along the link 202 corresponding to the link identifier 411.

The road type 416 stores the road type information on the road corresponding to the link 202. The road type 416 stores information including "footpath", "general road", or the like.

It should be noted that the link identifier 411 is not always necessary because the link 202 can be identified by using the node identifier 412 and the node identifier 413.

Hereinafter, description is made of specific processing for searching for the optimal path.

Figure 5:
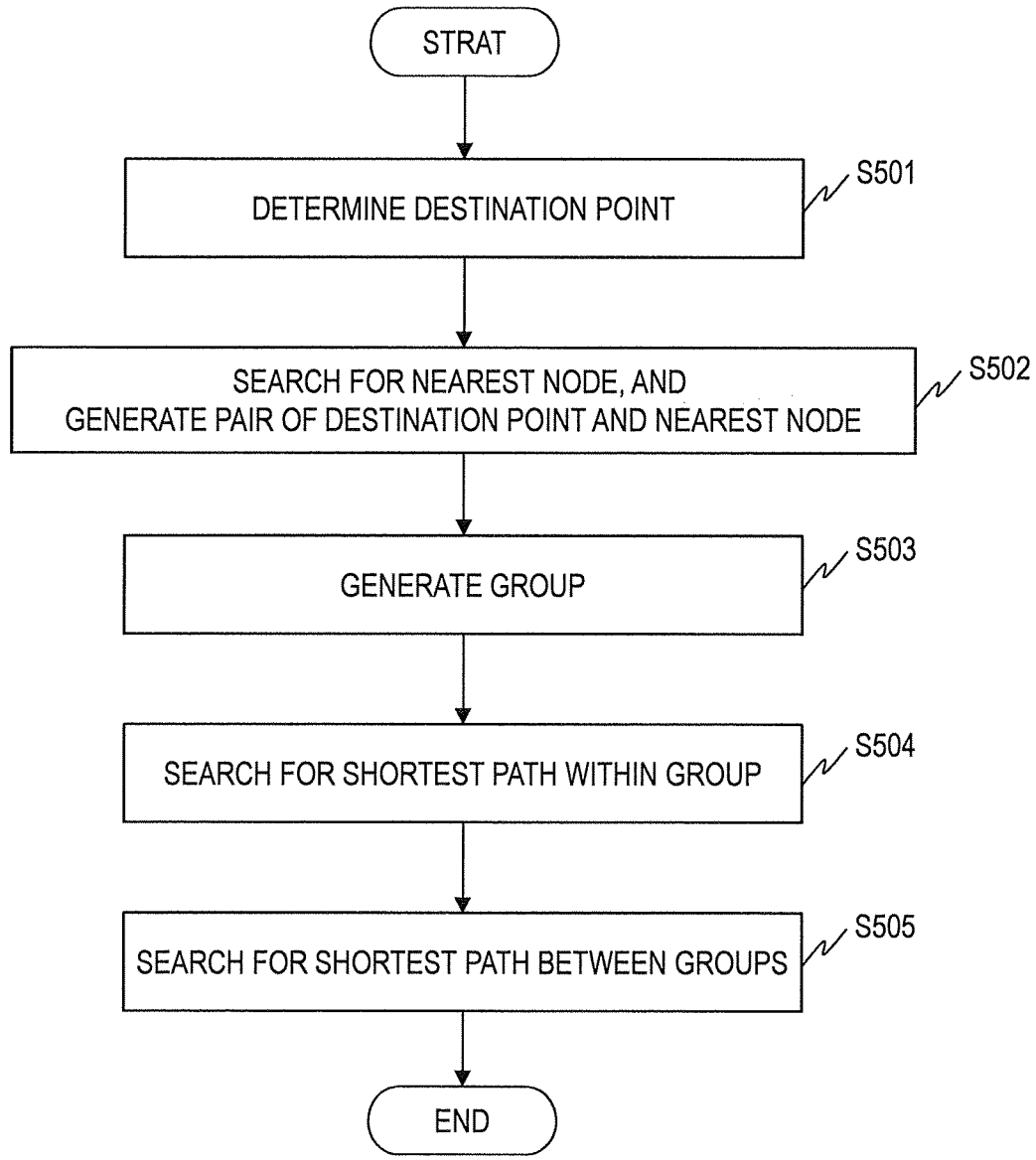
FIG. 5 is a flowchart illustrating search processing for the optimal path which is executed by a server according to the first embodiment of this invention.
Figure 6:
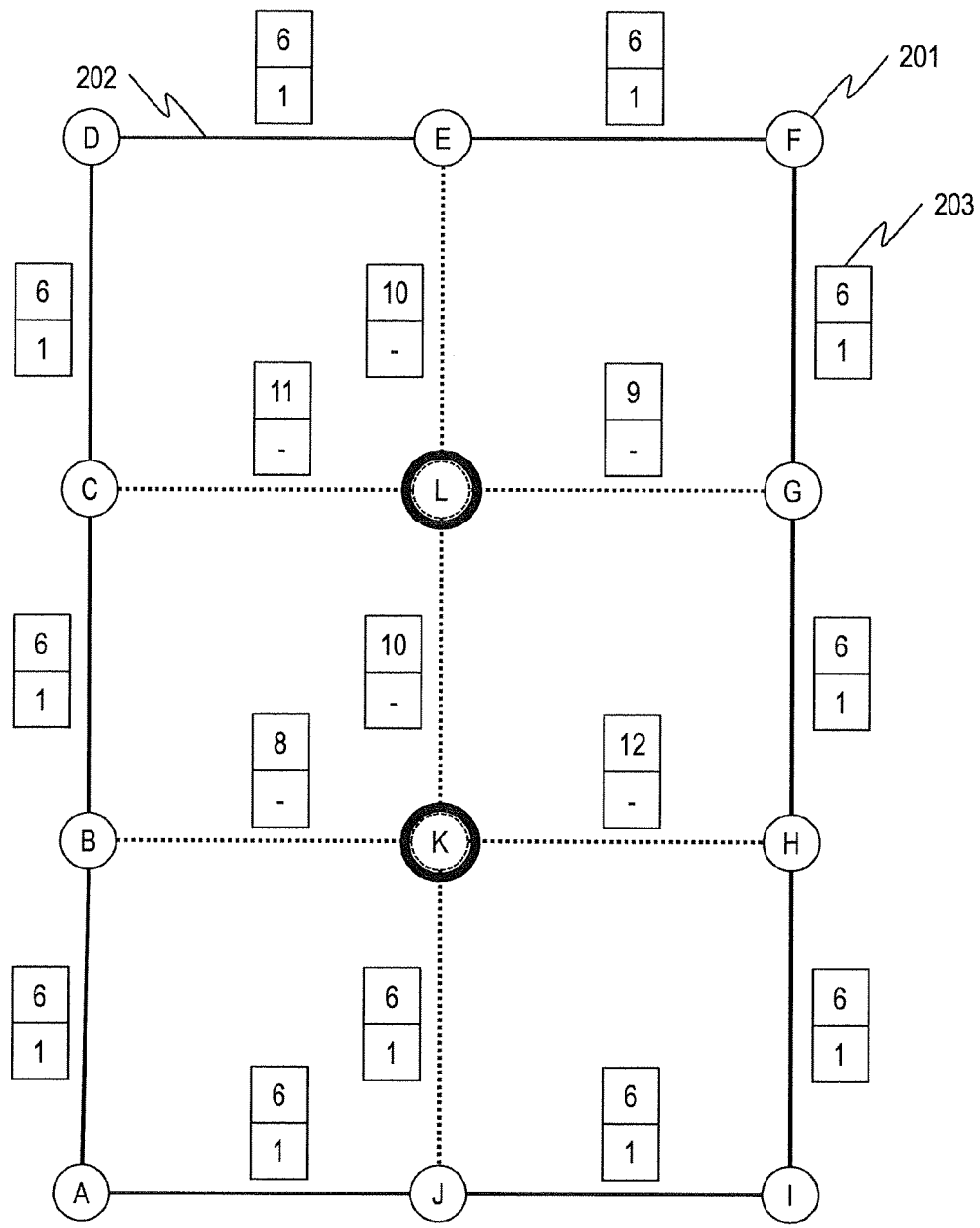
FIG. 6 is an explanatory diagram illustrating an example of the path network according to the first embodiment of this invention.

FIG. 5 is a flowchart illustrating search processing for the optimal path which is executed by the server 101 according to the first embodiment of this invention. FIG. 6 is an explanatory diagram illustrating an example of the path network according to the first embodiment of this invention.

The following description is made by taking the path network as illustrated in FIG. 6 as an example.

First, the server 101 determines the destination point (Step S501). Here, the destination point corresponds to a place visited by the surveyor in order to confirm items of crops within the farm field in a planting discrimination survey, and also corresponds to a place from which the surveyor is to enter the farm field in order to perform a crop estimate by unit acreage sampling in a survey based on the crop estimate by unit acreage sampling. It should be noted that a time required for the survey differs in accordance with the size of the farm field and the type of survey contents, but is assumed to be independent of a survey path, and is not taken into consideration in the search processing according to this embodiment.

Hereinafter, description is made by taking as an example a case where, as illustrated in FIG. 6, the node L 201 and the node K 201 are determined as the destination points. Hereinafter, the node L 201 and the node K 201 that are determined as the destination points are referred to as "destination point L" and "destination point K", respectively.

It should be noted that the destination point is not limited to the node 201, and the destination point can be determined on the link 202. This case is equivalent to a case of adding a new node 201 to the destination point on the link 202 and further dividing the link 202 to determine the newly-added node 201 as the destination point. Therefore, the following description is directed to the case where the node 201 is determined as the destination point.

The server 101 may determine the destination point based on information specified by the operator in consideration of work contents, or may automatically determine the destination point with reference to the path network DB 114 and the map DB 115. The following method is conceivable as a method of automatically determining the destination point by the server 101.

In the case of the planting discrimination survey, for example, the server 101 sets a loop as the farm field, at least one side of the loop coincides with a farm road or a footpath, among partial loops within the path network. And the server 101 preferentially determines the node 201 that also forms another farm field as the destination point, from among the nodes that form the loop. In addition, the server 101 adds the destination point until at least one node 201 is specified as the destination point among the nodes 201 that form each loop indicating at least the farm field. By the above-mentioned processing, the destination point is automatically determined. Here, the following method is conceivable as a method of extracting a partial loop from the path network.

In other words, the server 101 can extract a loop by repeating processing for following the link 202 from an arbitrary node 201 to the next node 201 by selecting the link directed most rightward.

The link directed "most rightward" cannot be specified in a general path network, but the latitude and longitude information is included in the node information table 400 within the path network DB 114 according to this embodiment, and hence the server 101 can grasp the direction on the map of the link connecting the nodes 201 from the latitude and longitude information. The server 101 assigns the mark to the link 202 that has been followed once, and executes the same processing in the subsequent loop extracting processing by selecting the link 202 that has not been followed.

It should be noted that the server 101 assigns the mark to the link 202 that connects a first node and a second node by distinguishing the travel in a direction from the first node to the second node and the travel in a direction from the second node to the first node.

Further, the following method is also conceivable as a method of automatically determining the destination point by the server 101. In a case where the planting can be discriminated from a distance even without going to the farm field, the server 101 references the 50-meter-mesh elevation data created by Geographical Survey Institute or the like stored in the map DB 115, determines a place with a fine view as the destination point, and uses the above-mentioned determination method to determine other destination points for the farm fields other than the farm fields that can be viewed from the determined destination point.

The method of automatically determining the destination point by the server 101 has been described so far. The description with reference to FIG. 5 is resumed.

Next, the server 101 searches for a nearest node 201 to each of the determined destination points, the nearest node 201 being the node 201 satisfying a predetermined condition, and generates a pair of the destination point and the nearest node 201 (Step S502). Here, the nearest node 201 represents the intersection node 201 to which it is possible to travel from the destination point and the intersection node 201 that exhibits the minimum travel cost from the destination point.

It should be noted that details of the search processing for the nearest node 201 and pair generation processing are described later by referring to FIG. 8.

Subsequently, the server 101 generates at least one group based on the generated pair (Step S503). Here, the group represents a partial set of the path network including at least one pair.

As a group generation method, three methods are conceivable: (Method 1) a method of dividing the path network into one group; (Method 2) a method of generating groups by combining pairs and combining groups; and (Method 3) a method of generating suitable groups at first and then adjusting the groups. Details thereof are described later.

Subsequently, the server 101 searches for the optimal path within the generated group (Step S504). In a case where a plurality of groups are generated, the optimal path is searched for on a group basis. By searching for the optimal path on a group basis, the server 101 can reduce a calculation amount.

In the search processing for the optimal path within the group, the server 101 searches for the optimal path followed by traveling through all the destination points within the group and at least one nearest node 201 with the minimum travel cost. At this time, the junction is determined from among the nearest nodes 201.

It should be noted that in a case where at least two junctions are included, the optimal path is searched for in the following manner.

In terms of the automobile travel, a path that exhibits the minimum travel cost between the junctions is searched for. In terms of the foot travel, a path that exhibits the minimum travel cost in a case of traveling from the junction to the junction via at least one destination point is searched for. It should be noted that the junction to be an arrival point may be the same as the junction set as a travel start point.

More specifically, in terms of the traveling between the junctions without passing through the destination point, a path followed by the automobile travel with the minimum travel cost is searched for. Further, in terms of the traveling between the junctions via at least one destination point, a path followed by the foot travel with the minimum travel cost is searched for. In other words, the path followed by the automobile travel and the path followed by the foot travel are optimized.

In Step S504, under a condition that at least one nearest node 201 is included, the path followed by traveling all the destination points within the group with the minimum travel cost is searched for. Accordingly, it is possible to maintain optimality of the travel paths and reduce the calculation amount of the search processing.

It should be noted that in a case where the optimal path is searched and the travel cost for the optimal path is calculated for each group in the processing of Step S503, the processing of Step S504 can be omitted because the same processing as Step S504 has already been executed.

Subsequently, the server 101 searches for the optimal path followed by traveling between all the groups one at a time (Step S505). In other words, an optimization of a travel path between the groups is executed.

The optimal path between the groups according to this embodiment is retrieved by searching the paths that connect an end point of the optimal path within one group retrieved in Step S504 and a start point of the optimal path within another group retrieved in Step S504. It should be noted that in a case where the undirected link is assumed, it is possible to replace the start point with the end point.

After finishing the processing of Step S505, the server 101 generates output information for displaying information regarding the retrieved optimal path, and transmits the output information to the terminal 100.

The search processing of Step S505 can be handled as a traveling salesman problem. The traveling salesman problem is an NP-hard problem, but if the number of groups is equal to or smaller than a predetermined number, the server 101 can retrieve the optimal path within a practical time by using an existing method such as a branch and bound method. Further, by using the server 101 according to this embodiment for each region to be subjected to an optimal path search in advance, it is possible to avoid an occurrence of an enormous calculation amount.

Figure 7:
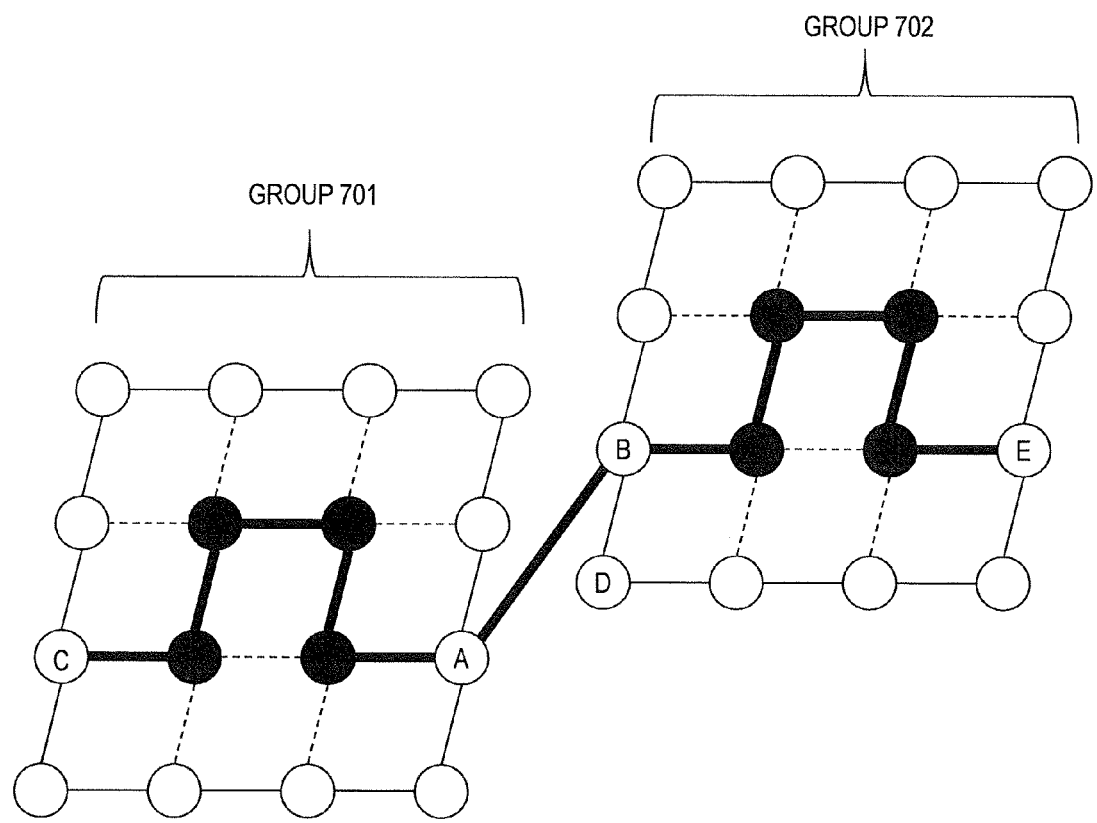
FIG. 7 is an explanatory diagram illustrating an example of the optimal path that connects between groups according to the first embodiment of this invention.

FIG. 7 is an explanatory diagram illustrating an example of the optimal path that connects between the groups according to the first embodiment of this invention.

FIG. 7 illustrates the optimal path that connects a group 701 and a group 702. The destination points within each of the groups are indicated by the black circles, and the optimal path within the groups is indicated by the thick line.

As illustrated in FIG. 7, in this embodiment, a path that connects between a node A and a node B is the optimal path that connects between the group 701 and the group 702.

It should be noted that there may be a possibility that the overall travel cost becomes minimum, if a path within each group is changed so that a path that connects between a node C and a node D becomes the optimal path. However, the calculation amount considerably increases, if the search processing is executed for all combinations of the start point and the end point in consideration of the travel costs within the groups and between the groups.

In this embodiment, in the processing for searching for the optimal path that passes through all the destination points, the optimal path within the group including the destination points and the nearest nodes 201 is searched for, and the optimal path that connects between the groups is searched for, thereby reducing the calculation amount. More specifically, the search processing is executed so that the start point and the end point within the group are fixed, the automobile travel is used for the traveling between the groups, and an optimization within the group including the foot travel is preferentially performed, thereby producing an effect of greatly reducing the calculation amount.

According to the above-mentioned processing, the server 101 can search for the optimal path obtained by combining the automobile travel and the foot travel.

Next, description is made of the search processing for the nearest node 201 performed in Step S502.

Figure 8:
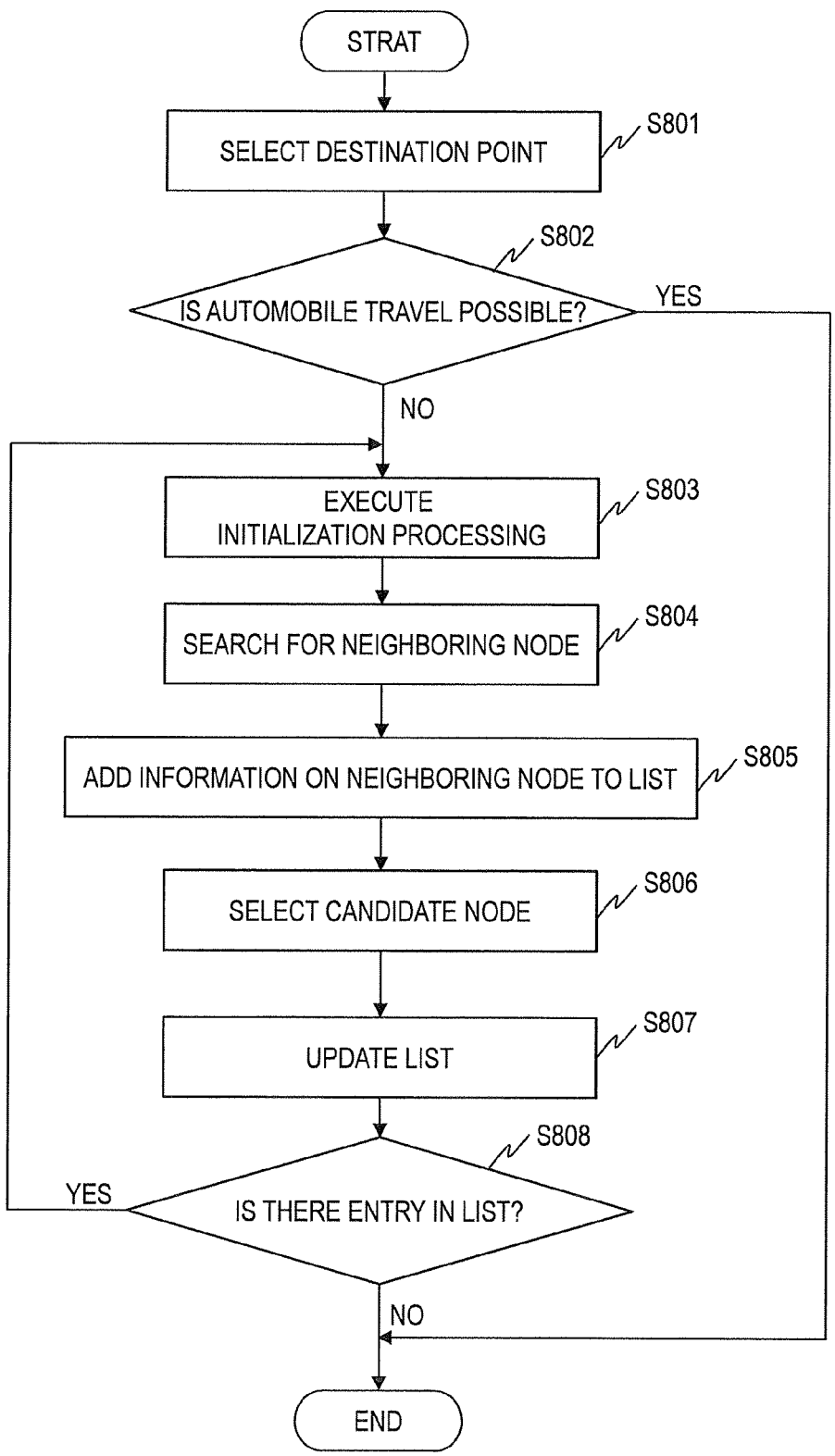
FIG. 8 is a flowchart illustrating search processing for a nearest node which is executed by the server according to the first embodiment of this invention.

FIG. 8 is a flowchart illustrating the search processing for the nearest node 201 which is executed by the server 101 according to the first embodiment of this invention.

First, the server 101 selects one destination point (Step S801). The processing of Step S802 and the subsequent steps is executed on a selected destination point basis. In other words, the processing of Step S802 to Step S808 is executed for each selected destination point.

The server 101 references the path network DB 114 to judge whether or not the automobile travel to the selected destination point is possible (Step S802). In other words, it is judged whether or not the destination point is the intersection node 201.

Specifically, the server 101 references the node information table 400 based on a node identifier of the selected destination point, and judges whether or not the vehicle travel 402 of the corresponding entry is "True". If the vehicle travel 402 of the corresponding entry is "True", it is judged that the destination point is the intersection node 201.

In the processing of Step S803 and the subsequent steps, the node 201 to be a candidate for the nearest node 201 is searched for, and the node 201 is updated by loop processing of Step S803 to Step S808 to thereby retrieve a true nearest node 201. Hereinafter, the node 201 to be the candidate for the nearest node 201 is referred to also as "candidate node 201".

If it is judged that the destination point is the intersection node 201, the server 101 finishes the processing because the destination point itself is the nearest node 201.

If it is judged that the destination point is not the intersection node 201, the server 101 executes initialization processing (Step S803).

Specifically, the server 101 executes the following processing.

The server 101 sets a node being a dummy (hereinafter, referred to as "dummy node 201") as the candidate node 201. Further, the server 101 sets a large value as the travel cost borne in the case of traveling to the dummy node 201 along the link 202. The initialization processing is for preventing the candidate node 201 from being searched for as the candidate node 201 again. It should be noted that in a case where the processing is executed for the first time, the setting processing for the dummy node 201 may be omitted.

Further, the server 101 generates a list 900 for searching for the nearest node 201.

Figures 9, 10:
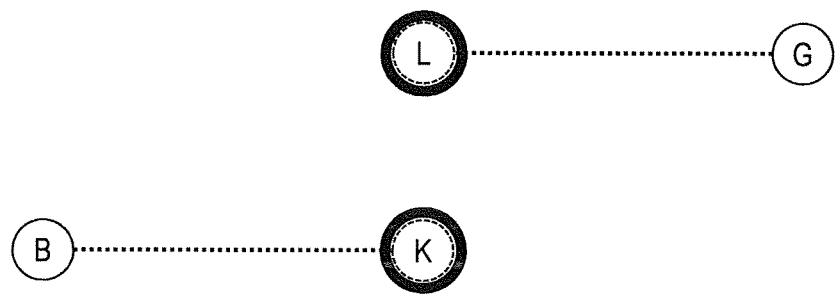
FIG. 9 is an explanatory diagram illustrating an example of a list according to the first embodiment of this invention.
FIG. 10 is an explanatory diagram illustrating an example of the pair of the destination point and a nearest node.

FIG. 9 is an explanatory diagram illustrating an example of the list 900 according to the first embodiment of this invention.

The list 900 includes a node identifier 901, a cumulative travel cost 902, and a path 903.

The node identifier 901 stores an identifier for identifying the candidate node 201. The cumulative travel cost 902 stores the travel cost from the destination point to the node 201 corresponding to the node identifier 901. The path 903 stores information regarding the travel path from the destination point to the node 201 corresponding to the node identifier 901. The path 903 stores, for example, the identifiers of the nodes 201 arranged in order of traveling from the destination point. However, information having any format that indicates the travel path may be used for the path 903.

In a case where the initialization processing is executed for the first time, the identifier of the selected destination point is stored in the node identifier 901, "0" is stored in the cumulative travel cost 902, and information indicating that there is no travel path is stored in the path 903. In the processing of Step S803 and the subsequent steps, the processing is executed by using the list 900.

After executing the initialization processing, the server 101 references the path network DB 114 and the list 900, and searches for a neighboring node 201 (Step S804).

Specifically, the server 101 selects the node 201 whose cumulative travel cost 902 has the smallest value from the list 900, and searches for the neighboring node 201 adjacent to the selected node 201.

Here, the neighboring node 201 represents the node 201 that is directly connected to the node 201 corresponding to the node identifier 901 by the link 202. In other words, the neighboring node 201 represents a node to which it is possible to travel from the node 201 corresponding to the node identifier 901 in one step.

Subsequently, the server 101 adds information regarding the neighboring node 201 to the list 900 (Step S805).

Specifically, the server 101 stores the identifier of the neighboring node 201 in the node identifier 901 of the corresponding entry. Further, the server 101 searches for the travel path to the neighboring node 201, and stores the travel path in the path 903. Further, the server 101 calculates the travel cost from the destination point to the neighboring node 201, and stores the calculated travel cost in the cumulative travel cost 902.

Subsequently, the server 101 references the path network DB 114 and the list 900, and selects the candidate node 201 (Step S806).

Specifically, the following processing is executed.

The server 101 references the node information table 400 of the path network DB 114, and extracts at least one entry corresponding to the intersection node 201 from the list 900.

The server 101 selects all entries of the intersection nodes 201 whose cumulative travel cost 902 is minimum and lower than the cumulative travel cost 902 to the current candidate node 201 from among the extracted entries. The server 101 selects the intersection node 201 corresponding to the selected entry as the candidate node 201. In other words, the current candidate node 201 is replaced by the selected intersection node 201.

If there is no entry that satisfies the above-mentioned condition, the server 101 selects all entries whose cumulative travel cost 902 is minimum and equal to the cumulative travel cost 902 to the current candidate node 201. The server 101 adds the selected entry as the candidate node 201.

In addition, the server 101 deletes the entries corresponding to the intersection nodes 201 from the list 900. It should be noted that if there is no entry in the list 900 at this time point, the server 101 may finish the processing because the candidate node 201 is the true nearest node 201. Further, entries corresponding to the nodes 201 other than the intersection nodes 201 are not deleted from the list 900.

Subsequently, the server 101 updates the list 900 (Step S807).

Specifically, the server 101 references the path network DB 114, and deletes from the list 900 the node 201 whose cumulative travel cost 902 is equal to or higher than the cumulative travel cost 902 of the candidate node 201.

Subsequently, the server 101 judges whether or not there exists an entry in the list 900 (Step S808).

If it is judged that there exists an entry in the list 900, the server 101 returns to Step S803 to execute the same processing. It should be noted that in the initialization processing of Step S803, a large value is set as the travel cost for the candidate node 201 in order to prevent the nearest node 201 from being selected twice.

If it is judged that there exists no entry in the list 900, the server 101 determines the current candidate node 201 as the nearest node 201, and finishes the processing.

According to the above-mentioned processing, it is possible to search for the nearest node 201, the travel cost from the destination point to the nearest node 201, and the travel path (optimal path) from the destination point to the nearest node 201.

The optimal path that connects the destination point and the nearest node 201 is a candidate for a path for traveling to the first destination point on foot after getting off the automobile, and is also a candidate for a path for traveling by the foot travel from the destination point to a place at which it is possible to ride the automobile. In other words, the nearest node 201 is the node 201 to be a candidate for the junction.

In this embodiment, by limiting the candidate for the junction to the nearest node 201, it is possible to limit a search range unlike in a case of searching the optimal path with all the nodes 201 set as junctions. This produces effects of reduction in the calculation amount and reduction in processing time for searching for the optimal path.

On the other hand, the limitation of the search range raises a fear that a path diverted from a true optimal path may be searched for. However, the travel costs of the automobile travel and the foot travel greatly differ from each other, and hence the fear that the optimality of a solution may be impaired can be suppressed to an extremely low level by preferentially performing the optimization of the path so that the travel cost of the foot travel becomes minimum and setting any one of the nearest nodes 201 as the junction.

By the above-mentioned method, any one of the candidate nodes 201 is selected even in a case where there are a plurality of candidate nodes 201 that exhibit the minimum travel cost, but this invention is not limited thereto. In other words, a plurality of nearest nodes 201 may be extracted. In this case, the method may include executing optimal path search processing for each of the nearest nodes 201 and determining the final junction.

It should be noted that in the example illustrated in FIG. 6, pairs as illustrated in FIG. 10 are generated. In other words, a pair of the destination point L and a nearest node G 201 and a pair of the destination point K and a nearest node B 201 are generated.

Next, description is made of a method of grouping a pair in Step S503.

Figure 11:
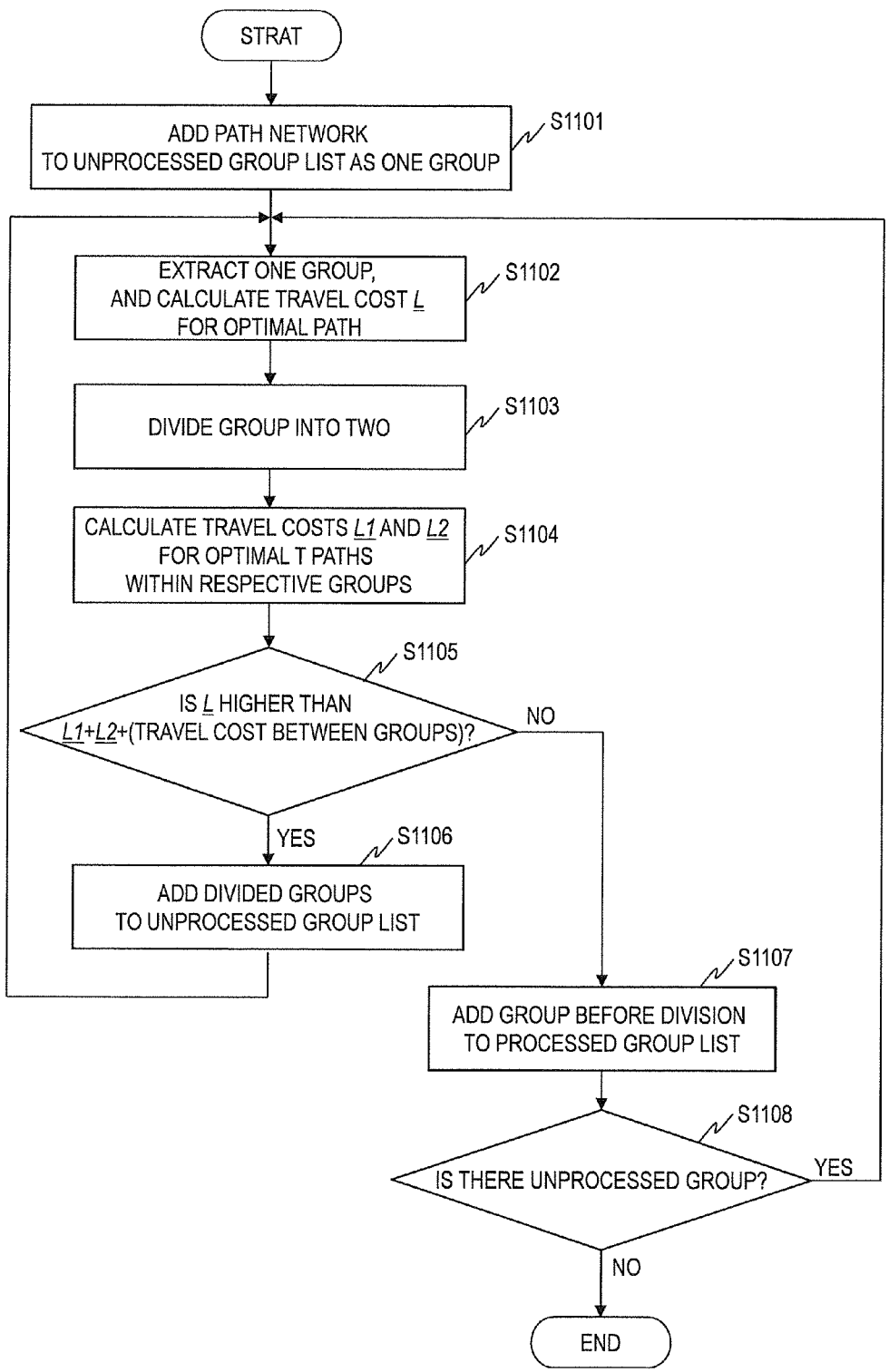
FIG. 11 is a flowchart illustrating grouping processing for a pair according to the first embodiment of this invention.

FIG. 11 is a flowchart illustrating grouping processing for a pair according to the first embodiment of this invention.

Referring to FIG. 11, description is made of the grouping processing corresponding to (Method 1), in other words, grouping processing of dividing the path network into one group. It should be noted that hereinafter, the description is made by taking FIG. 6 as an example.

First, the server 101 adds the path network to an unprocessed group list as one group (Step S1101). In the case of FIG. 6, the path network illustrated in FIG. 6 is added to the unprocessed group list as one group.

Subsequently, the server 101 selects one group to be a processing object from the unprocessed group list, searches for the optimal path within the selected group, and further calculates the travel cost for the retrieved optimal path (Step S1102). It should be noted that the optimal path is retrieved from among the paths that connect the start point being the intersection node 201 and the end point being the intersection node 201 by passing through all the destination points.

Here, description is made of a search method for the optimal path within a group.

The problem of searching for the optimal path that passes through all the destination points within a group can also be handled as a traveling salesman problem, and if the number of destination points is not large, it is possible to retrieve the optimal path within a practical time by using an existing method such as a branch and bound method. On the other hand, if the number of destination points is large, the use of (Method 2) and (Method 3) is preferred to the use of (Method 1).

It should be noted that the search processing for the optimal path within a group needs to take it into consideration whether or not there is a driver who drives the automobile. This is because it is possible to move the automobile to another point during the survey at the destination point and during the foot travel if there is the driver. Therefore, if there is the driver, the node 201 being the start point within the group may be different from the node 201 being the end point.

For example, in the case of FIG. 6, all the nodes 201 from the node A 201 to the node J 201 can be set as the start point, and any one of the node A 201 to the node J 201 can also be set as the end point independently of the start point.

It should be noted that in the path network of the undirected links along which the travel costs between nodes do not depend on the travel directions, the path having the node A 201 and the node H 201 set as the start point and the end point, respectively, and the path followed by traveling in the opposite direction exhibit the same travel costs, and hence it suffices to search for any one of the paths. On the other hand, in the case of searching for the optimal path in the path network of the directed links, even for the same path, the travel costs in both the travel directions need to be calculated in consideration of the travel directions.

Further, in this embodiment, it is assumed that the automobile has completed the movement to the intersection node 201 during the foot travel and during the survey, but if this assumption is not established, the travel cost of the automobile travel from the point to get off the automobile to the point to get on the automobile is compared with a total of the travel cost of the foot travel and a survey cost, and the higher travel cost may be considered as the travel cost for the path.

If there is no driver, the server 101 may execute the search processing for the optimal path under a condition that the start point and the end point are identical.

It should be noted that the information indicating whether or not there is a driver is specified by the operator or the surveyor. This specification determines whether or not the path start point and the path end point are identical.

Further, the operator or the surveyor may instruct the server 101 to execute the search processing for the optimal path under both the conditions that there is a driver and that there is no driver. In this case, by displaying the optimal paths under the respective conditions for the operator or the surveyor, the server 101 can assist the operator or the surveyor to judge whether or not to be accompanied by the driver at the time of the survey.

In addition, the server 101 can display a difference in survey time, a difference in necessary fuel, and costs such as a labor cost (or taxi fare) in the case of being accompanied by the driver, for the respective optimal paths under the different conditions. Further, the server 101 can convert the difference in survey time, the difference in necessary fuel, and the like into an amount of money involved in the survey based on coefficients corresponding thereto and can display which of the conditions it is advantageous in terms of money to perform the survey under.

Figure 12A:
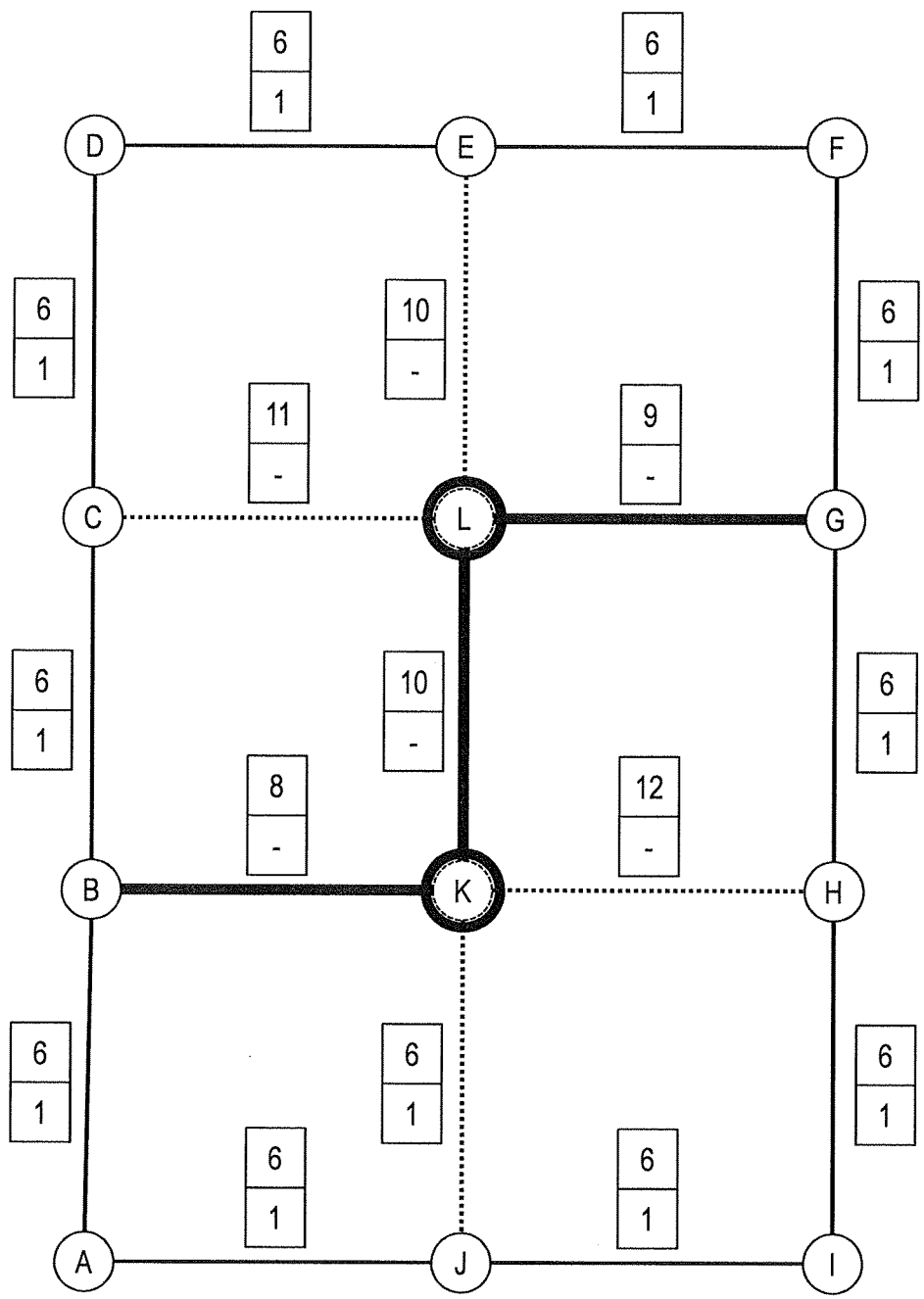
FIG. 12A is an explanatory diagram illustrating an example of the optimal path in the case where there is a driver according to the first embodiment of this invention.
Figure 12B:
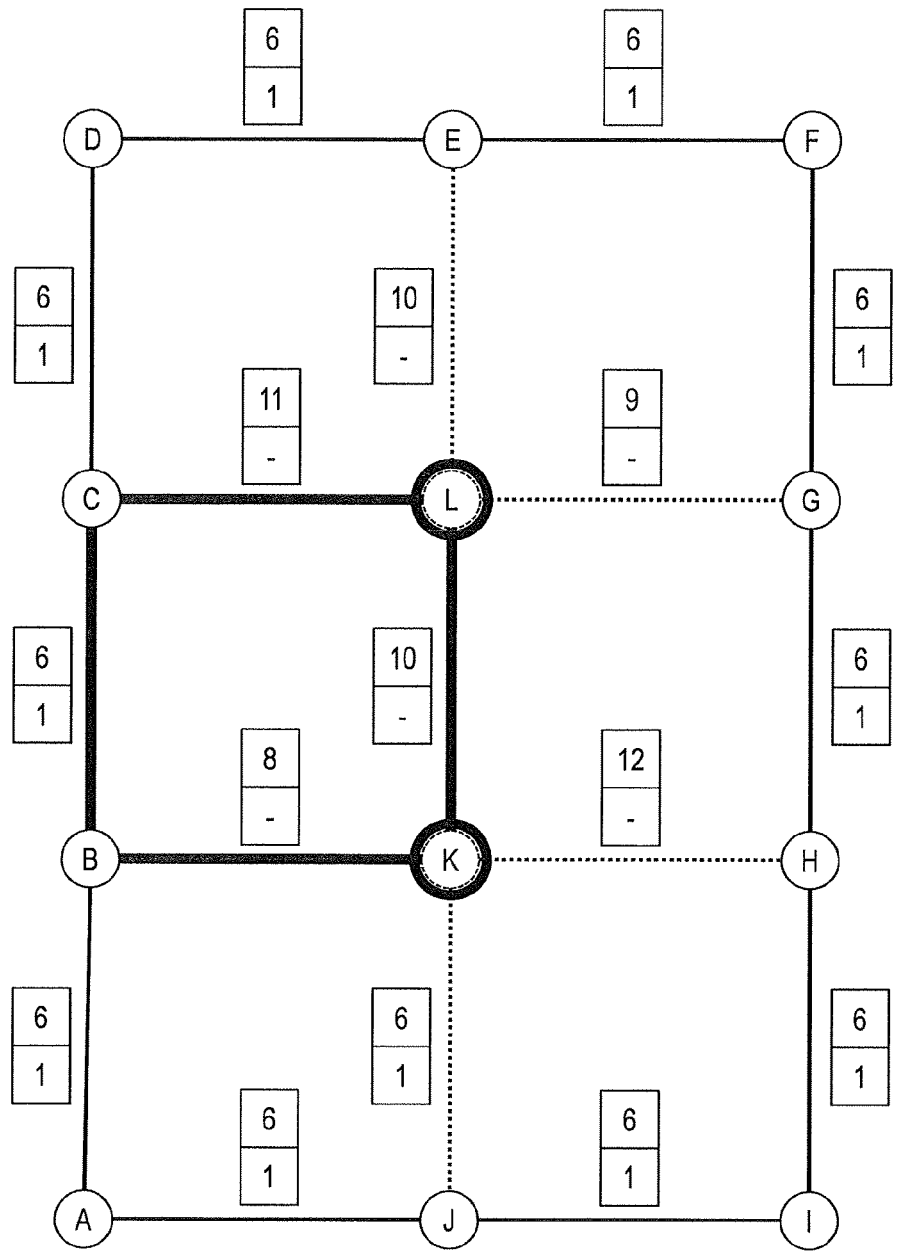
FIG. 12B is an explanatory diagram illustrating an example of the optimal path in the case where there is no driver according to the first embodiment of this invention.

The optimal paths in the respective cases where there is a driver and there is no driver by taking FIG. 6 as an example are illustrated in FIGS. 12A and 12B.

FIG. 12A is an explanatory diagram illustrating an example of the optimal path in the case where there is a driver according to the first embodiment of this invention. FIG. 12B is an explanatory diagram illustrating an example of the optimal path in the case where there is no driver according to the first embodiment of this invention.

FIGS. 12A and 12B illustrate the paths along which the surveyor is to travel.

As illustrated in FIG. 12A, the optimal path of the surveyor in the case where there is a driver is the path (B, K, L, G) or the path (G, L, K, B). It should be noted that the optimal path for the travel path of the driver of the automobile is any one of the path (B, C, D, E, F, G) and the path (B, A, J, I, H, G).

As illustrated in FIG. 12B, the optimal path in the case where there is no driver is the path (B, K, L, C, B), the path (B, C, L, K, B), the path (C, L, K, B, C) or the path (C, B, K, L, C). It should be noted that in the path (B, K, L, C, B), the foot travel is used to travel from the node C 201 to the node B 201. The same applies to the other paths.

In each of the optimal paths illustrated in FIGS. 12A and 12B, the getting on/off of the automobile is performed once, but the paths that pass through all of the destination points include a path in which the getting on/off of the automobile is performed a plurality of times. For example, in a conceivable path, the node B 201 is set as the start point so as to travel to the node K 201 and return to the node B 201 on foot, and the surveyor gets on the automobile at the node B 201 again, travels to the node C 201 by automobile, gets off the automobile at the node C 201, travels to the node L 201 on foot, and further returns to the node C 201 to get on the automobile. In such a case, a cost at the time of getting on/off the automobile can also be taken into consideration as the travel cost for the optimal path.

For example, in a case of traveling with measurement hardware carried in a trunk compartment of the car, the cost at the time of getting on/off the automobile corresponds to a time required to prepare the measurement hardware after the getting off of the automobile or required to load the measurement hardware after the survey. In this case, the server 101 may search for the optimal path by adding a predetermined cost at the time of getting on/off the automobile at the intersection node 201 between the foot travel and the automobile travel.

The description with reference to FIG. 11 is resumed.

Subsequently, the server 101 divides the group into two (Step S1103).

Various division methods are conceivable. For example, a position (latitude and longitude) between the destination points on a map can be used to perform the division by the K-means method using a Euclidean distance as a distance scale and other such methods.

Figure 13:
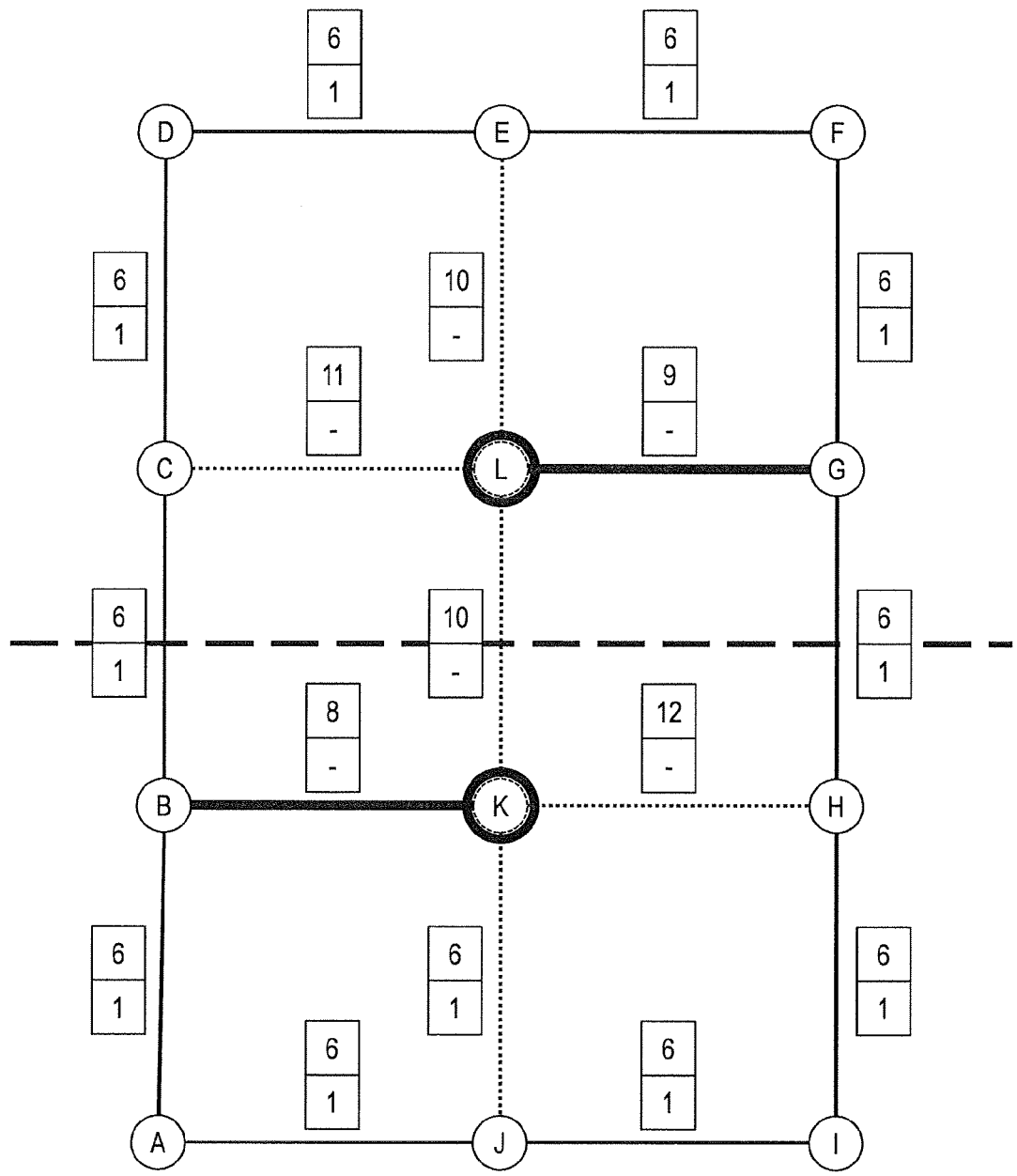
FIG. 13 is an explanatory diagram illustrating an example of a division of the group according to the first embodiment of this invention.

FIG. 13 is an explanatory diagram illustrating an example of the division of the group according to the first embodiment of this invention.

Subsequently, the server 101 searches for the optimal path that connects the start point of the path being the intersection node 201 and the end point of the path being the intersection node 201 by passing through all the destination points in each of the divided groups, and calculates travel costs L1 and L2 within the two respective groups (Step S1104). The method of searching for the optimal path is the same as Step S1102, and hence description thereof is omitted.

In a case where the division is performed as in FIG. 13, the path (G, L, G) becomes the optimal path in the upper group, while the path (B, K, B) becomes the optimal path in the lower group.

Subsequently, the server 101 judges whether or not the travel cost for the optimal path within the group before the division are higher than the travel costs for the optimal paths within the respective groups after the division (Step S1105).

Specifically, assuming that the travel cost for the optimal path within the group before the division is L, the travel costs for the optimal paths within the respective groups after the division are L1 and L2, and the travel cost necessary to travel between the groups is LG, it is judged whether or not "L>L1+L2+LG" is satisfied.

In the example illustrated in FIG. 13, with regard to the traveling between the groups, the path (B, C, D, E, F, G) or the path (B, A, J, I, H, G) becomes the optimal path because of exhibiting the minimum travel cost.

If it is judged that the travel costs for the optimal paths after the division are equal to or lower than the travel cost for the optimal path before the division, the server 101 adds the divided groups to the unprocessed group list because the travel cost after the division can be reduced as a whole (Step S1106), and returns to Step S1102 to execute the same processing.

If it is judged that the travel costs for the optimal paths after the division are higher than the travel cost for the optimal path before the division, the server 101 deletes the group before the division from the unprocessed group list because the travel costs before the division can be reduced as a whole, and further adds the group before the division to a processed group list (Step S1107).

Subsequently, the server 101 judges whether or not there is an unprocessed group in the unprocessed group list (Step S1108).

If it is judged that there is an unprocessed group in the unprocessed group list, the server 101 returns to Step S1102 to execute the same process.

If it is judged that there is no unprocessed group in the unprocessed group list, the server 101 finishes the processing.

According to the above-mentioned processing, the divided groups are stored in the processed group list.

In the case of FIG. 12A, the travel cost of the surveyor becomes "8+10+9=27". In the case of FIG. 12B, the travel cost of the surveyor becomes "8+10+11+6=35".

On the other hand, in the case where the division is performed as illustrated in FIG. 13, the travel cost within the group including the destination point L becomes "9+9=18"

irrespective of the presence/absence of the driver, while the travel cost within the group including the destination point K becomes "8+8=16" irrespective of the presence/absence of the driver. Further, in terms of the travel cost between the groups, the path (B, C, D, E, F, G) or the path (B, A, J, I, H, G) becomes the optimal path, and the travel cost for the optimal path becomes "5". It should be noted that the travel cost between the groups is a simple optimal path search problem, and the optimal path can be searched for by an existing method such as the Dijkstra method.

Therefore, the travel cost before the division is lower than the travel costs after the division, and hence the group is not divided irrespective of the presence/absence of the driver.

In the above-mentioned division processing, a judgment result of Step S1105 can differ according to the division method. For example, in the case of performing the division by using the K-means method, even if it is judged that the travel cost before the division is lower than the travel costs after the division, it can be judged that the travel costs after the division are lower than the travel cost before the division in a case of performing the division by using another division method.

Therefore, in Step S1103 and Step S1104, the group may be divided by using a plurality of division methods, the travel costs may be compared in terms of the division methods, and the determination processing of Step S1105 may be executed based on the division method exhibiting the minimum travel costs after the division.

Figure 14:
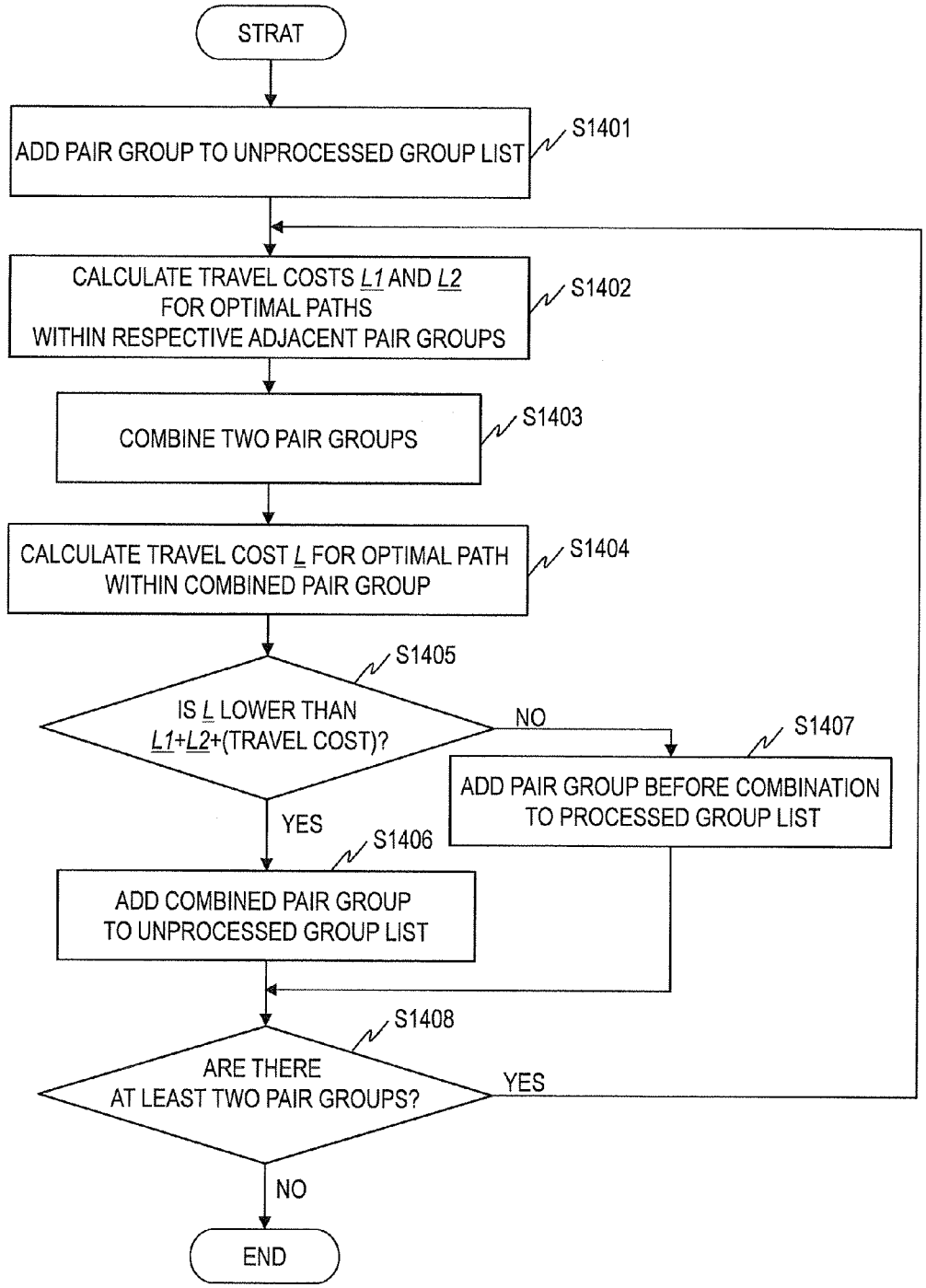
FIG. 14 is a flowchart illustrating grouping processing for a pair according to the first embodiment of this invention.

FIG. 14 is a flowchart illustrating grouping processing for a pair according to the first embodiment of this invention.

Referring to FIG. 14, description is made of the grouping processing corresponding to (Method 2), in other words, a grouping method of generating a group by combining pairs or groups. It should be noted that hereinafter, the description is made by taking FIG. 6 as an example.

First, the server 101 adds a pair of the destination point and the nearest node 201 to the unprocessed group list as one group (Step S1401). It should be noted that a group is generated by combining a plurality of pairs in the following processing. Therefore, one pair is also handled as one group in the grouping processing. Hereinafter, the pair is referred to also as "pair group".

Subsequently, the server 101 extracts two adjacent pair groups from the unprocessed group list, searches for the optimal paths within the respective pair groups, and further calculates the travel cost for each of the retrieved optimal paths (Step S1402).

Here, as a method of selecting the two adjacent pair groups, various methods are conceivable such as a method of selecting the pair groups that exhibit the minimum travel cost therebetween and a method of selecting the pair groups that exhibit the minimum overall distance between centers of gravity of the destination points and the nearest nodes within the pair groups. In this embodiment, it is assumed that the pair groups that exhibit the minimum travel cost between the pair groups is selected as the adjacent pair groups.

Subsequently, the server 101 combines the extracted two pair groups (Step S1403). Here, the combination of the pair groups means to generate a union of all sets of pairs of the destination points and the nearest nodes included in the two pair groups.

Subsequently, the server 101 searches for the optimal path within the combined pair group, and calculates the travel cost for the retrieved optimal path (Step S1404).

Subsequently, the server 101 judges whether or not the travel cost for the optimal path within the combined pair group is lower than the travel costs for the optimal paths within the respective pair groups before the combination (Step S1405).

Specifically, assuming that the travel costs for the optimal paths within the respective pair groups before the combination are L1 and L2, the travel cost between the pair groups is LG, and further the travel cost for the optimal path within the pair group after the combination is L, it is judged whether or not "L<L1+L2+LG" is satisfied.

If it is judged that the travel cost for the optimal path within the pair group after the combination is lower than the travel costs for the optimal paths within the respective pair groups before the combination, the server 101 adds the combined pair group to the unprocessed group list (Step S1406), and advances to Step S1408. This is because the travel cost can be reduced as a whole by combining the two pair groups.

If it is judged that the travel cost for the optimal path within the pair group after the combination is equal to or more than the travel costs for the optimal paths within the respective pair groups before the combination, the server 101 adds the respective pair groups before the combination to the processed group list (Step S1407), and advances to Step S1408. This is because the travel cost can be reduced as a whole without combining the two pair groups.

Subsequently, the server 101 judges whether or not there are two or more unprocessed pair groups in the unprocessed group list (Step S1408).

If it is judged that there are two or more unprocessed pair groups in the unprocessed group list, the server 101 returns to Step S1402 to execute the same process.

If it is judged that there is one or less unprocessed pair group in the unprocessed group list, the server 101 adds the unprocessed pair group to the processed group list, and finishes the processing.

According to the above-mentioned processing, the combined pair group remains in the processed group list.

It should be noted that the selected two pair groups are added to the processed group list in Step S1407 based on the notion that the travel cost is less likely to be reduced even in a case of being combined with another pair group, if the travel cost is not reduced even in the case where the two adjacent pair groups are combined.

The above-mentioned assumption may not apply depending on the definition of the adjacent groups, the distribution of the destination points within the pair group, the characteristics of the path network, and the like. Therefore, instead of selecting the two adjacent pair groups, it is also possible to use a method of selecting a plurality of candidates to be combined, calculating reduction amounts of the travel costs for respective combinations of candidates, and the combination exhibiting the largest reduction amount of the travel cost is used for the actual combination.

Hereinafter, description is made of a case where the method illustrated in FIG. 14 is applied to the path network as illustrated in FIG. 6.

In Step S1401, the server 101 adds two groups formed of the pair of the destination point K and the nearest node B 201 and the pair of the destination point L and the nearest node G 201, which are illustrated in FIG. 10, respectively to a group list.

In Step S1402, the server 101 extracts two groups from the group list, searches for the optimal paths for the respective groups, and calculates the travel costs L1 and L2 for the respective optimal paths. Here, only two groups are included in the group list, and hence these groups are automatically selected.

Specifically, the travel cost within the group formed of the pair of the destination point K and the nearest node B 201 is calculated as "18", while the travel cost within the group formed of the pair of the destination point L and the nearest node G 201 is calculated as "16".

Further, between the groups before the combination, the automobile travel from an intersection node B 201 to an intersection node G 201 becomes the optimal path, and hence the travel cost between the groups before the combination is calculated as "5" assuming that the travel cost at the intersection node 201 is "0".

Therefore, the travel costs before the combination are calculated as "39".

Figure 15:
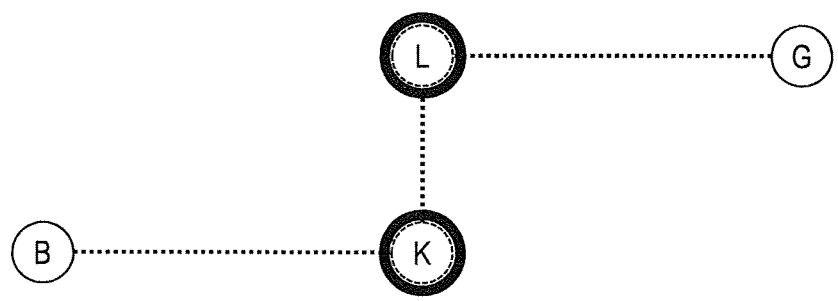
FIG. 15 is a explanatory diagram illustrating an example of a combination of the group.

In Step S1403, the two groups are combined as illustrated in FIG. 15.

At this time, in Step S1404, the travel cost after the combination is calculated as "27".

In Step S1405, the server 101 judges that the travel cost after the combination is lower than the travel costs before the combination, and further in Step S1406, adds the combined group to the group list.

At this time point, only one group exists in the group list, and hence this group remains as the processed group. Therefore, one group within which the travel cost for the optimal path is "27" is obtained. It should be noted that in the example illustrated in FIG. 6, the same conclusion is reached irrespective of whether or not there is a driver.

(Method 3) is a grouping method based on the assumption that the adjacent destination points are highly likely to result in the same group.

For example, the server 101 uses K-means clustering or the like to generate a suitable number of groups from initial groups based on positional information on the destination point. In addition, it is conceivable to employ such an algorithm that the server 101 randomly executes the grouping methods of (Method 1) and (Method 2) for the generated groups and finishes the processing if the reduction in the travel cost becomes "0" a fixed number of times.

(Method 3) is advantageous in that the number of times to solve the traveling salesman problem exhibiting a large calculation amount can be reduced by using the clustering method such as the K-means method exhibiting a small calculation amount to roughly perform the grouping.

Further, the operator or the surveyor may specify the initial groups. It should be noted that these groups are specified based on arbitrary references such as villages and regions, which are not always optimal as the groups at the time of the survey, and hence it is desired that optimal groups be generated by combining by the above-mentioned grouping methods.

The configuration of the optimal path search system according to the first embodiment is not limited to the above-mentioned configuration. For example, the terminal 100 may include the path network DB 114 or the map DB 115 and execute the search processing for the optimal path. In this case, the server 101 may transmit information on the destination point of which the surveyor who carries around the terminal 100 is in charge, to the terminal 100, and the terminal 100 may execute the search processing for the optimal path only with respect to the specified destination points.

According to the first embodiment, in the search processing for the optimal path obtained by combining the foot travel and the automobile travel that are different in the travel cost, by searching for the optimal path for traveling through the destination point and the junction, it is possible to maintain the optimality of the travel path and reduce the calculation processing necessary for the search processing.

Further, by executing the search processing with the nearest nodes 201 to the respective destination points set as the candidates for the junctions, it is possible to greatly reduce the range of a path search without impairing the optimality of the path. Therefore, it is possible to reduce the calculation amount and quickly present the optimal path.

Further, by dividing the path network into a plurality of groups including the destination points, the problem can be divided into an optimization of the travel path by the foot travel within the group and an optimization of the travel path by the automobile travel between the groups. This can greatly reduce the range of the path search without impairing the optimality of the path.

Further, under the respective conditions that there is a driver and that there is no driver, the optimal path obtained by combining the automobile travel and the foot travel can be presented to the surveyor. In other words, the travel path by the automobile travel, the travel path by the foot travel, and the point (junction) to get on/off the automobile can be respectively displayed.

Second Embodiment

Description is made of an optimal path search system according to a second embodiment, which optimizes respective travel paths of a combine harvester, a transport truck, and a material handling machine and transshipment points of crops.

The combine harvester reaps crops within the farm field, and harvests the crops by performing threshing work and the like for the reaped crops. The combine harvester can accumulate a fixed amount of harvested crops, but does not have a loading capacity enough to accumulate the crops over the entire farm field. Therefore, the crops loaded in the combine harvester need to be transshipped to a material handling vehicle as appropriate.

The transport truck is loaded with a large amount of crops, and transports the crops to a facility such as a country elevator. The transport truck has characteristics of being unable to move within the farm field and being able to travel along only the periphery of the farm field.

The material handling machine carries the crops loaded in the combine harvester to the transport truck, and transships the crops harvested to the transport truck. The material handling machine is free to move within the farm field, and can travel to a point at which the transshipment to the transport truck is possible.

When the loading capacity of the combine harvester becomes a predetermined value or larger, reaping work is interrupted, thereby lowering the working efficiency. In other words, the working efficiency of the harvesting depends on the operating state of the combine harvester, and hence an operation schedule of the combine harvester is assigned the highest priority. Therefore, an object of the optimal path search system according to the second embodiment is to optimize the travel paths of the material handling machine and the transport truck and the transshipment points of the crops without interrupting the reaping work of the combine harvester.

Figure 16:
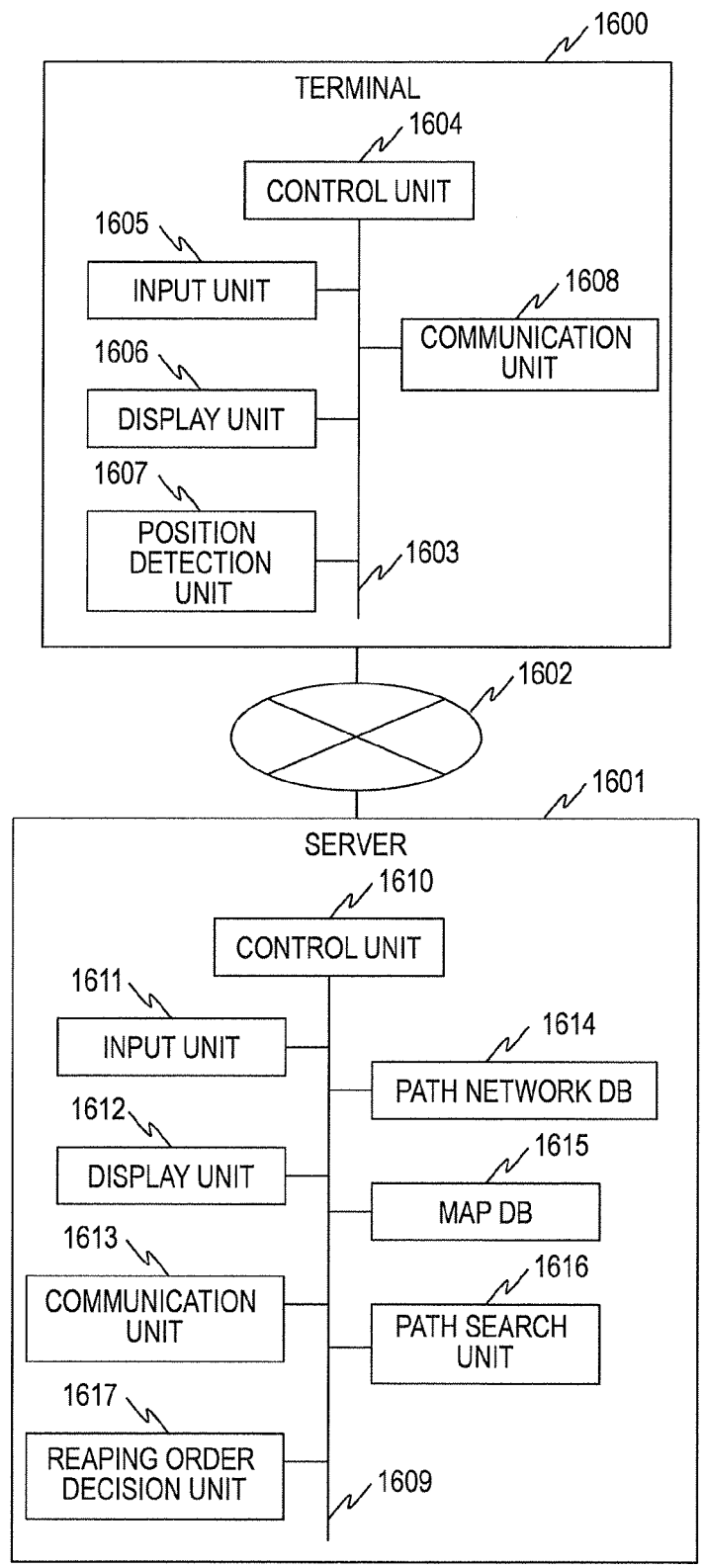
FIG. 16 is a block diagram illustrating an example of a configuration of the optimal path search system according to the second embodiment of this invention

FIG. 16 is a block diagram illustrating an example of a configuration of the optimal path search system according to the second embodiment of this invention.

The optimal path search system according to the second embodiment includes terminals 1600 that are respectively mounted to the combine harvester, the transport truck, and the material handling machine, a server 1601, and a network 1602 that couples the terminal 1600 and the server 1601 to each other.

The terminal 1600 includes a control unit 1604, an input unit 1605, a display unit 1606, a position detection unit 1607, and a communication unit 1608. The respective components are coupled to one another by a data communication bus 1603. It should be noted that the terminal 1600 may include another component.

The control unit 1604 executes processing for implementing functions included in the terminal 1600. The control unit 1604 can be implemented by, for example, a processor.

The input unit 1605 receives an information presentation request, a setting request for a path search condition, and the like from a worker. The input unit 1605 can be implemented by buttons, a touch panel, and the like.

The display unit 1606 displays information including a map image and path information for the worker. The display unit 1606 can be implemented by, for example, a liquid crystal display.

The position detection unit 1607 detects a current position of the terminal 1600. The position detection unit 1607 can be implemented by, for example, a GPS or a self-contained navigation unit.

The communication unit 1608 communicates with the server 1601 via the network 1602. Specifically, the communication unit 1608 transmits information regarding the current position of the terminal 1600, the information presentation request, the setting request for a path search condition, and the like to the server 1601, and also receives a map image showing the periphery of the current position of the terminal 1600, optimal path information, and the like from the server 1601. The communication unit 1608 can be implemented by a cellular phone network card, a WiMAX network card, or the like.

It should be noted that the respective components included in the terminal 1600 may be implemented by using software. For example, the software that implements the respective components can be used as the terminal 1600 that can be carried around by the surveyor by being introduced into an existing device such as a cellular phone, a smart phone, a portable game machine, a car navigation system, or a personal navigation device (PND).

The server 1601, which lies at the heart of this invention, searches for an optimal harvesting path (optimal path) obtained by combining the combine harvester, the material handling machine, and the transport truck, and transmits information regarding the retrieved optimal path to the terminal 1600.

The server 1601 includes a control unit 1610, an input unit 1611, a display unit 1612, a communication unit 1613, a path network DB 1614, a map DB 1615, a path search unit 1616, and a reaping order determination unit 1617. The respective components are coupled to one another by a data communication bus 1609.

The control unit 1610 executes processing for implementing functions included in the server 1601. The control unit 1610 can be implemented by, for example, a processor.

The input unit 1611 is an interface for allowing an operator to operate the server 1601. The input unit 1611 can be implemented by, for example, a keyboard, a mouse, buttons, and a touch panel.

The display unit 1612 displays various kinds of information for the operator. The display unit 1612 can be implemented by, for example, a liquid crystal display.

The communication unit 1613 communicates with at least one terminal 1600 via the network 1602. The communication unit 1613 transmits the information regarding the optimal path to the terminal 1600, and also transmits a peripheral map image corresponding to the current position of the terminal 1600 to the terminal 1600. The communication unit 1613 can be implemented by, for example, a network card.

The path network DB 1614 stores the information regarding the path network. The path network according to this embodiment is structured of roads that can be passed through by the transport truck, nodes indicating geographic points, and links that connect between the nodes. It should be noted that the node holds attribute information indicating whether or not the transshipment is possible. Further, the combine harvester and the material handling machine can pass through the road that can be passed through by the transport truck.

The map DB 1615 stores map images expressed in a raster format or a vector format. Formats such as JPEG, PNG, and TIFF can be used for the map images. The map DB 1615 stores the map images on a resolution basis, and stores the map images divided into zones. With this configuration, when the current position of the terminal 1600 changes, the server 1601 can transmit the map image of an appropriate zone which has an appropriate resolution to the terminal 1600. Therefore, a map corresponding to the current position is displayed on the terminal 1600. It should be noted that scalable vector graphics (SVG) and the like can be used for the map images in the vector format.

The path search unit 1616 searches for the optimal path for allowing the combine harvester, the material handling machine, and the transport truck to cooperate to perform harvesting work, and outputs the information regarding the retrieved optimal path to the operator or the worker.

Here, the search for the optimal path for allowing the combine harvester, the material handling machine, and the transport truck to cooperate to perform the harvesting work means to optimally determine each of the travel path of the combine harvester, the travel path of the material handling machine, the point at which the transshipment is performed from the combine harvester to the material handling machine, the point at which the transshipment is performed to the transport truck, and the travel path of the transport truck.

The reaping order determination unit 1617 determines a reaping order for the farm field. It should be noted that the reaping order is determined based on a reference different from the travel cost.

Hereinafter, description is made of the search processing for the optimal path according to the second embodiment.

Figure 17:
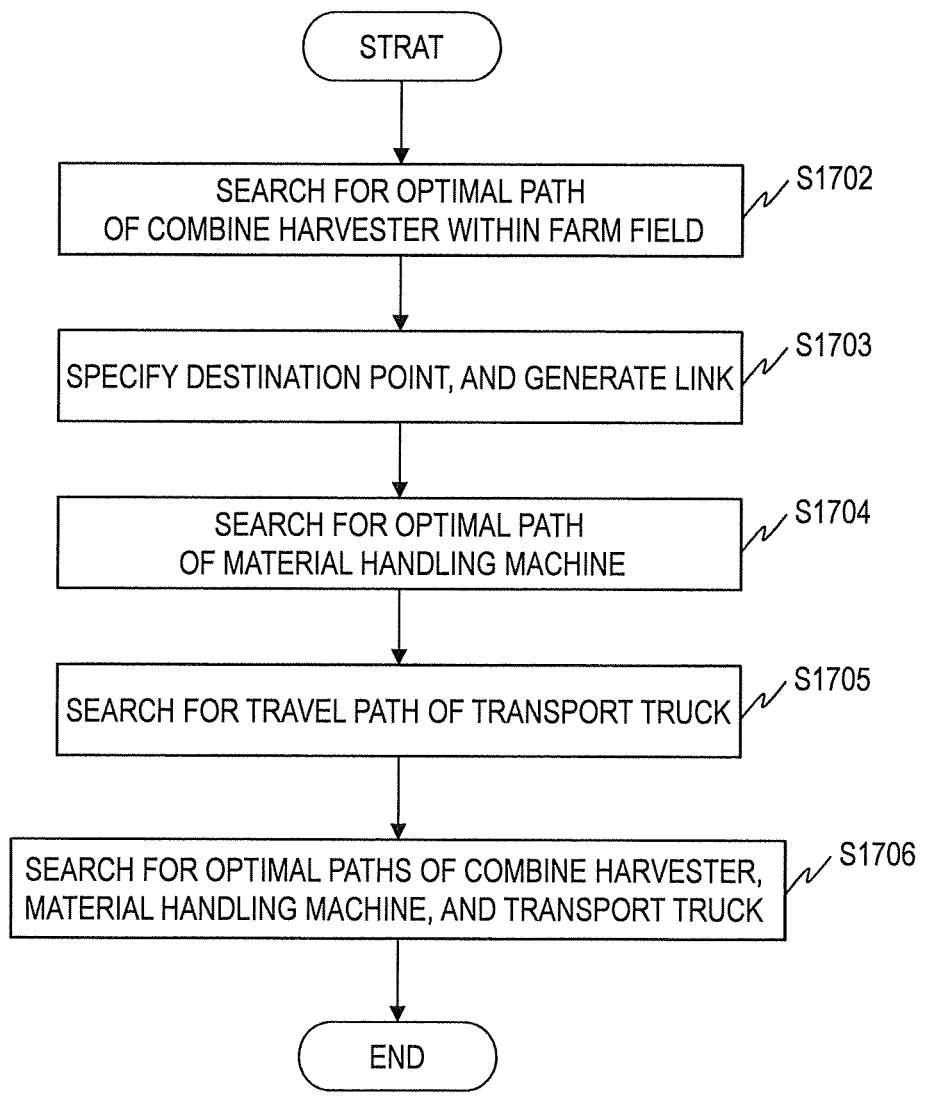
FIG. 17 is a flowchart illustrating the optimal path search processing executed by the server according to the second embodiment of this invention.

FIG. 17 is a flowchart illustrating the optimal path search processing executed by the server 1601 according to the second embodiment of this invention.

The path search unit 1616 first deter mines the travel path of the combine harvester within the farm field. The search is performed by dividing the travel path of the combine harvester into the travel path between the farm fields and the travel path within the farm field. This corresponds to the processing for searching for the optimal path between the groups and the optimal path within the group according to the first embodiment.

First, the server 1601 searches for the optimal path of the combine harvester within each farm field (Step S1702).

As an example of searching for the optimal path of the combine harvester within the farm field, such a method as disclosed in JP 2004-354117 A can be used to perform the search by allowing a user's pattern to be selected from among existing traveling patterns such as a normal system (near), a normal system (far), a pillow-less system, and a one-side pillow-less system. It should be noted that the method disclosed in JP 2004-354117 A allows the operator to select the travel path within the farm field in consideration of a combination of an entrance to and an exit from the farm field. If no selection is made by the operator, a default travel path type may be selected in correspondence with the combination of the entrance and the exit.

Subsequently, the server 1601 references the path network DB 1614 to add the travel path of the combine harvester within the farm field to the path network that expresses only the roads that can be passed through by the transport truck (Step S1703).

In Step S1703, the following processing is executed.

First, the server 1601 determines the destination point on the optimal path of the combine harvester. Specifically, the combine harvester needs to perform transshipment work to the material handling machine every fixed time interval, and hence the server 1601 determines travel points reached by the combine harvester every fixed time interval as the destination points. In order to express the destination points on the path network, nodes may be generated at the destination points and determined as the destination points. This processing corresponds to the processing of Step S501 according to the first embodiment.

The server 1601 searches the path network around the determined destination point for a point (node) at which the material handling machine can transship the harvested crops to the transport truck. This node corresponds to the intersection node 201 according to the first embodiment. Hereinafter, the point that allows the transshipment to the transport truck is referred to as "transshipment point".

The server 1601 generates a link between the destination point and the transshipment point. Here, the travel cost along the link can be calculated from a geographical distance between the points and an average traveling speed of the material handling machine.

Further, the server 1601 generates the link from each of the destination points to the transshipment point exhibiting the minimum travel cost. The generated link corresponds to the link along which the automobile travel is impossible according to the first embodiment. Further, the link to only one transshipment point is generated from each of the destination points, and hence the transshipment point corresponds to the nearest node according to the first embodiment. In other words, this processing corresponds to the processing of Step S502 according to the first embodiment.

Meanwhile, in a case where the destination points arranged in traveling order of the combine harvester are each represented by a destination point k (k=1, 2, 3, . . . ), the server 1601 also generates links from the destination point k to the nearest nodes to a destination point k−1 and a destination point k+1.

However, only the link to the nearest node to the destination point 2 is generated from the destination point 1, and similarly, from the last destination point, only the link to the nearest node to the second last destination point is generated. This is because there is no corresponding destination point prior to the first destination point and no corresponding destination point next to the last destination point.

Further, if the link exists between the destination point and the nearest node, the server 1601 does not need to generate the link twice. By the above-mentioned processing, the path network equivalent to that of FIG. 2 according to the first embodiment is generated.

Subsequently, the server 1601 searches for the optimal path of the material handling machine (Step S1704). This step corresponds to the processing of Step S503 and Step S504 according to the first embodiment.

First, in the grouping processing for a pair of the destination point and the nearest node, it suffices to group all pairs within the farm field.

Subsequently, the server 1601 searches for the shortest path within the group (corresponding to Step S504). In the first embodiment, the order of traveling through the destination points is arbitrary, while in the second embodiment, it is necessary to travel through the destination points in the same order that the combine harvester travels. Further, the material handling machine always needs to travel to the transshipment point after traveling to the destination point.

For example, in a case where the combine harvester travels through the destination point 1, the destination point 2, and the destination point 3 in the stated order, the travel path follows the nearest node to the destination point 1, the destination point 1, the nearest node to the destination point 1 or the nearest node to the destination point 2, the destination point 2, the nearest node to the destination point 2 or the nearest node to the destination point 3, the destination point 3, and the nearest node to the destination point 3 in the stated order.

Therefore, selected as the shortest path of the material handling machine is a path exhibiting the lower travel cost between the path (destination point k, nearest node to the destination point k, destination point k+1) and the path (destination point k, nearest node to the destination point k+1, destination point k+1). The nearest node included in the selected path corresponds to the junction according to the first embodiment.

By the above-mentioned processing, the travel path optimal for the material handling machine is calculated.

Subsequently, the server 1601 searches for the travel path of the transport truck (Step S1705).

The travel path of the transport truck is a path for traveling between the junctions with the minimum cost. In other words, with regard to the travel path of the transport truck, if the next transshipment point is different after the material handling machine performs the transshipment at a predetermined transshipment point, a simple path for traveling to the different transshipment point becomes the optimal path. Here, it is assumed that a cost required when the transport truck travels to the different transshipment point is always lower than the travel cost borne by the material handling machine and a cost required when the combine harvester transships the harvested crops, and this assumption is satisfied in a normal state.

Finally, the server 1601 searches for the optimal paths of the combine harvester, the material handling machine, and the transport truck between the farm fields (Step S1706).

A wide paved road is normally used to travel between the farm fields, and hence the optimal paths of the respective machines are often the same, but the optimal paths may differ by setting different path networks of the respective machines.

In the search processing for the optimal path in a case where there is no restriction in the order of traveling between the farm fields, the server 1601 can calculate the optimal path between the respective farm fields by the Dijkstra method and retrieve the optimal path within a practical time by using an existing method such as a branch and bound method as a traveling salesman problem.

On the other hand, there is a case where the reaping order is determined in advance for each farm field. For example, corn and paddy rice are normally reaped substantially in planting order, and with regard to wheat, there is a practical method of determining an order of harvesting by obtaining a vegetation index NDVI=((near-infrared intensity)−(red intensity))/((near-infrared intensity)+(red intensity)) from a satellite photograph and estimating a water content amount from the calculated value.

The reaping order determination unit 1617 uses the above-mentioned existing determination method for the reaping order to determine the reaping order between the farm fields. The path search unit 1616 searches for the optimal paths of the combine harvester, the material handling machine, and the transport truck between the respective farm fields in accordance with the reaping order determined by the reaping order determination unit 1617. With regard to the search method, it is conceivable to use, for example, the Dijkstra method, but another method may be used.

As described above, in the second embodiment, the destination points are determined on the travel path (optimal path) of the combine harvester, the pairs of the destination points and the transshipment points are generated, and the pairs are searched for the optimal path of the material handling machine. In other words, any ones of the transshipment points are determined as the junctions, and the optimal path of the material handling machine that passes through the destination points and the junctions is searched for. In addition, the path of the transport truck for optimally traveling through the determined junctions is also searched for.

Figure 18A:
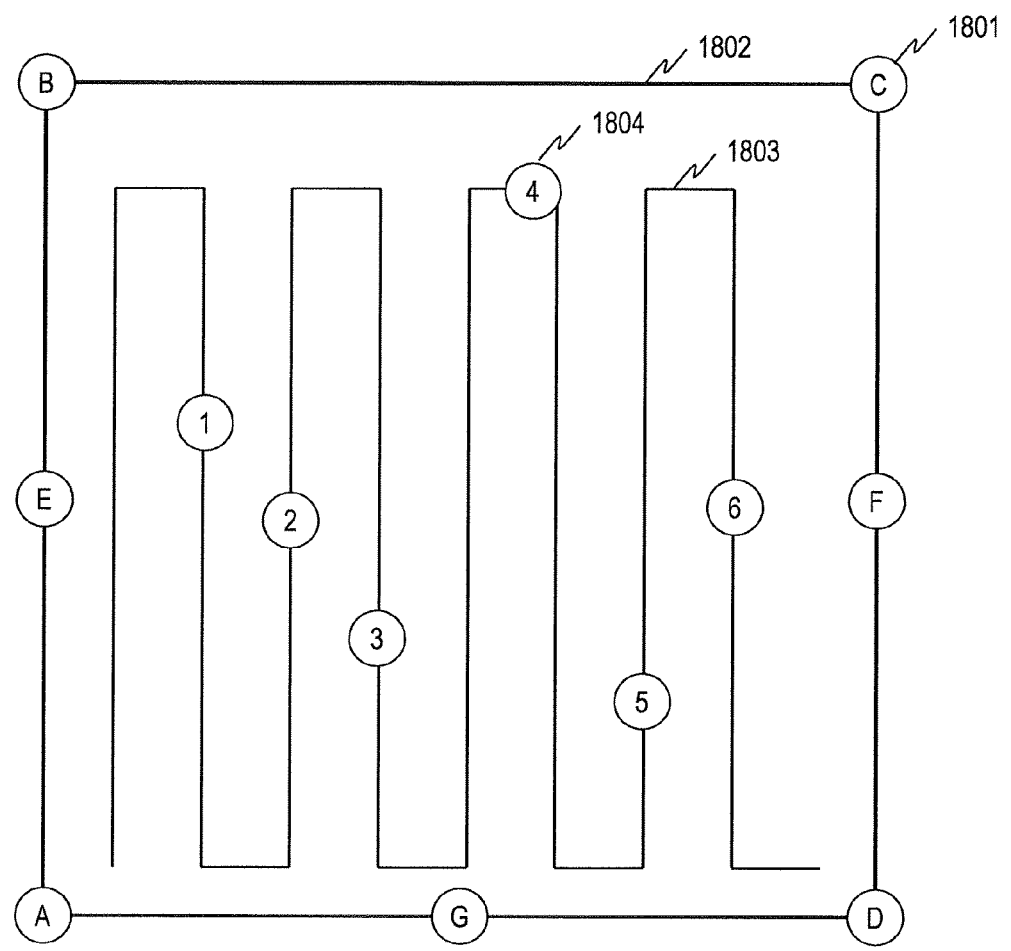
FIGS. 18A, 18B, and 18C are explanatory diagrams illustrating an example of the path network according to the second embodiment of this invention.
Figure 18B:
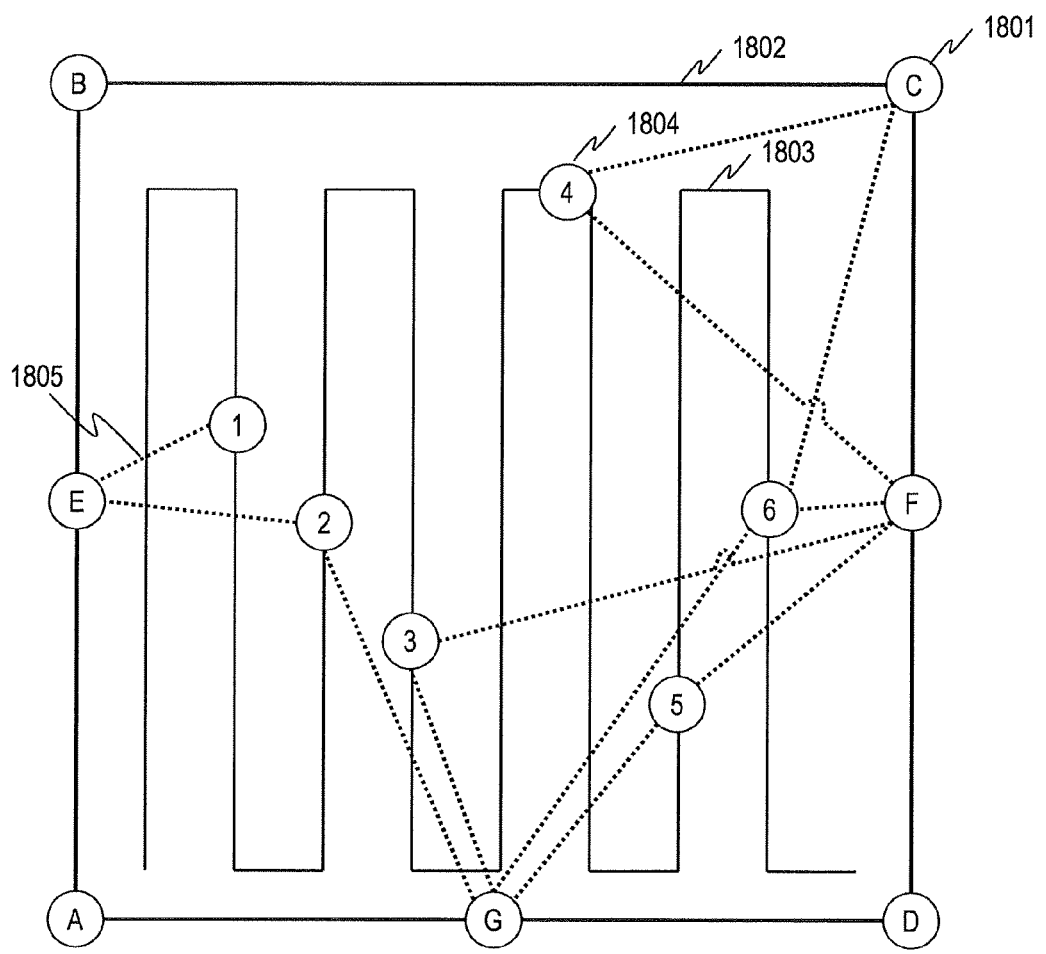
Figure 18C:
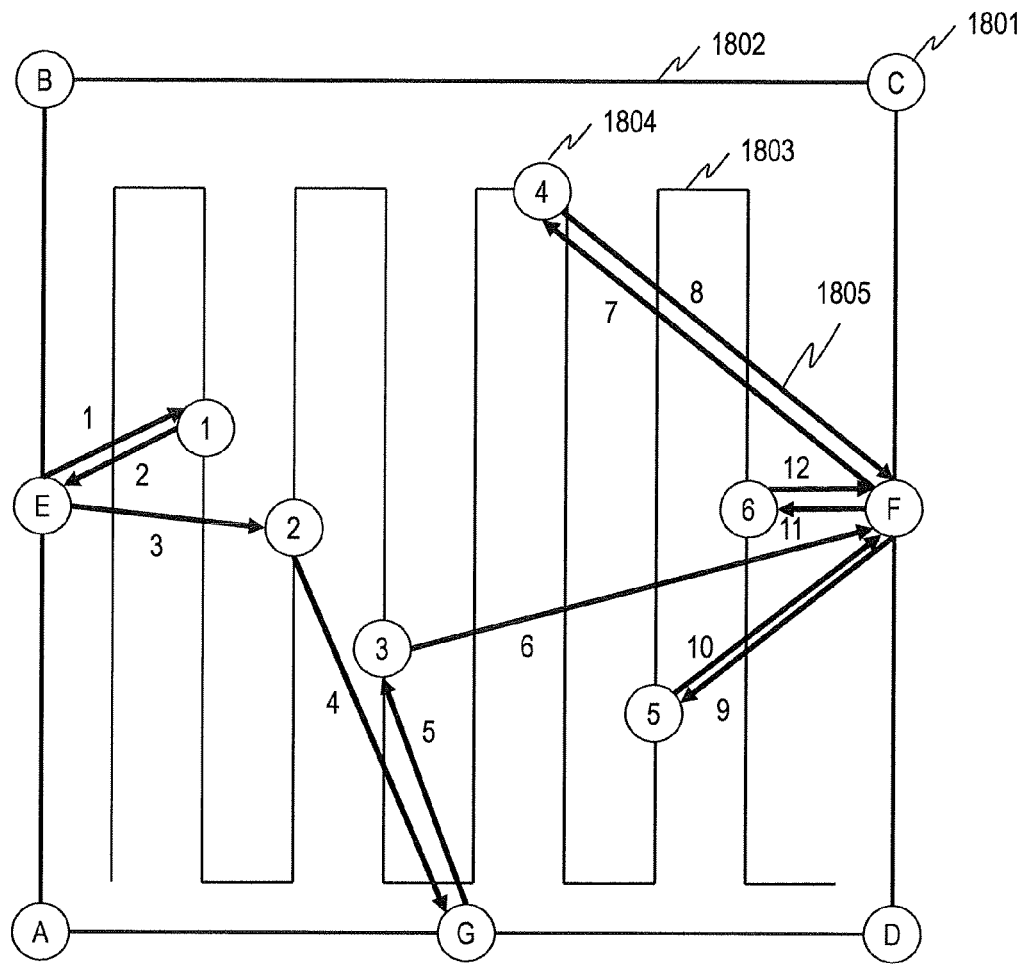

FIGS. 18A, 18B, and 18C are explanatory diagrams illustrating an example of the path network according to the second embodiment of this invention.

FIG. 18A illustrates the path network obtained after the processing of Step S1702 is executed and the destination points are determined on the optimal path of the combine harvester.

In FIG. 18A, a node A 1801 to a node D 1801 indicate the points through which only the combine harvester and the material handling machine can travel. A node E 1801 to a node G 1801 indicate the transshipment points.

A portion surrounded by the nodes 1801 and links 1802 indicate the farm field. The links 1802 indicate the paths along which the transport truck can travel.

A path 1803 indicates the optimal path of the combine harvester. In the example illustrated in FIG. 18A, the path 1803 indicates the path along which the combine harvester starts working from the node A 1801 and travels to the node D 1801.

Points 1804 indicate points at which the combine harvester transships the harvested crops, in other words, the destination points. In the example illustrated in FIG. 18A, the points 1804 indicate that the combine harvester travels in numerical order thereof.

FIG. 18B illustrates the path network obtained after the links are generated between the destination points and the transshipment points.

Links 1805 indicate the links between the destination points and the transshipment points.

FIG. 18C illustrates the path network obtained after the processing of Step S1704 is executed.

Solid lines 1806 that connect the destination points and the transshipment points indicate the optimal path of the material handling machine. In the example illustrated in FIG. 18C, numerals assigned to the solid lines 1806 indicate the traveling order of the material handling machine.

According to the second embodiment, it is possible to optimize the harvesting path obtained by combining the combine harvester, the material handling machine, and the transport truck.

While the present invention has been described in detail and pictorially in the accompanying drawings, the present invention is not limited to such detail but covers various obvious modifications and equivalent arrangements, which fall within the purview of the appended claims.

What is claimed is:

1. An optimal path search system, which optimizes a travel path of a moving object moved using a moving means among a plurality of moving means, and the moving means moving the object is changed to a different moving means among the plurality of moving means, comprising:
   a path information database;
   a path search unit that searches for an optimal path that exhibits a minimum travel cost borne by the moving object, from among travel paths of the moving object; and
   an output unit that outputs information regarding the optimal path from the path search unit, wherein the path information database stores:
   path network management information for managing a path network that is structured of a plurality of nodes indicating points through which the moving object is able to travel and a plurality of links that connect the plurality of nodes; and
   travel cost management information for managing travel costs, which are necessary to travel along each of the plurality of links by using each of the plurality of moving means which can be used to travel along each of the plurality of links;
   the plurality of nodes include a plurality of intersection nodes that can be reached by traveling along the plurality of links by using either a particular moving
   means or another moving means among the plurality of moving means, wherein the path search unit is configured to:
   determine a plurality of destination points which can be reached only by using the particular moving means on the path network, the destination points are nodes within the path network;
   reference the path information database to search for first travel paths, each for traveling from each of the destination points to each of the intersection nodes, and calculate a first travel cost that is necessary for the moving object to travel along each of the retrieved first travel paths;
   search for a nearest intersection node to each of the destination points, the nearest intersection node being one of the intersection nodes corresponding to the first travel path having the lowest calculated first travel cost;
   generate pairs, each being obtained by associating each of the destination points with the nearest intersection node thereof;
   generate a plurality of groups, each being a partial set of the path network including at least one destination point and one or two of the generated pairs of the destination point and the nearest intersection node thereof;
   reference the path information database to search for second travel paths within each of the groups along each of which the moving object travels through all of the destination points included in the group and one or two nearest intersection nodes included in the group, and calculate second travel costs, each being necessary for the moving object to travel along each of the retrieved second travel paths;
   determine one of the second travel paths for which the calculated second travel cost is minimum as an intra-group optimal path;
   reference the path information database to search for third travel paths between groups along which the moving object travels between the groups, and calculate third travel costs, each being necessary for the moving object to travel along each of the retrieved third travel paths;

determine one of the third travel paths for which the calculated third travel cost is minimum as an inter-group optimal path; and determine the optimal path based on the intra-group optimal path and the inter-group optimal path; and the output unit outputs data for displaying information regarding the optimal path and the travel paths of each of the plurality of moving means.

2. The optimal path search system according to claim 1, wherein:

the travel cost includes a travel time; and the travel cost management information includes the travel time of each of the plurality of moving means that can travel along each of the plurality of links.

3. The optimal path search system according to claim 1, wherein the optimal path search system is further configured to search for the second travel paths which connect a start point being one of the two nearest intersection nodes included in the group and an end point being the other of the two nearest nodes included in the group by passing through all of the destination points included in the group.

4. The optimal path search system according to claim 3, wherein the start point and the end point are set to the identical nearest node.

5. The optimal path search system according to claim 3, wherein the path search unit is further configured to:

define a first group in a case of generating the plurality of groups;

reference the path information database to search for the intra-group optimal path within the first group, and calculate a fourth travel cost that is necessary for the moving object to travel along the intra-group optimal path within the first group;

reference, assuming that the first group is divided into a second group and a third group, the path information database to search for the intra-group optimal path within each of the second group and the third group, and calculate a fifth travel cost that is necessary for the moving object to travel along the intra-group optimal path within the second group and a sixth travel cost that is necessary for the moving object to travel along the intra-group optimal path within the third group;

reference the path information database to search for the inter-group optimal path between the second group and the third group, and calculate a seventh travel cost that is necessary for the moving object to travel along the inter-group optimal path;

compare a total value of the fifth travel cost, the sixth travel cost, and the seventh travel cost with a value of the fourth travel cost; and divide the first group into the second group and the third group in a case where it is judged that the total value of the fifth travel cost, the sixth travel cost, and the seventh travel cost is lower than the value of the fourth travel cost.

6. The optimal path search system according to claim 3, wherein the path search unit is further configured to:

define a first group and a second group in a case of generating the plurality of groups;

reference the path information database to search for the intra-group optimal path within the first group, and calculate a eighth travel cost that is necessary for the moving object to travel along the intra-group optimal path within the first group;

reference the path information database to search for the intra-group optimal path within the second group, and calculate a ninth travel cost that is necessary for the moving object to travel along the intra-group optimal path within the second group;

reference the path information database to search for the inter-group optimal path between the first group and the second group, and calculate an tenth travel cost that is necessary for the moving object to travel along the retrieved inter-group optimal path;

reference, assuming that the first group and the second group are combined to generate a third group, the path information database to search for the intra-group optimal path within the third group, and calculate a eleventh travel cost that is necessary for the moving object to travel along the intra-group optimal path within the third group;

compare a value of the eleventh travel cost with a total value of the eighth travel cost, the ninth travel cost, and the tenth travel cost; and combine the first group and the second group to generate the third group in a case where it is judged that the value of the eleventh travel cost is lower than the total value of the eighth travel cost, the ninth travel cost, and the tenth travel cost.

7. The optimal path search system according to claim 1, wherein the optimal path search system is configured to:

reference, in a case of determining the destination points, the path information database to extract loops which include a road among partial loops within the path network; and determine nodes on one of the extracted loop that form another one of the extracted loops as the destination point.

8. An optimal path search method executed in an optimal path search system, which optimizes a travel path of a moving object moved using a moving means among a plurality of moving means, and the moving means moving the object is changed to a different moving means among the plurality of moving means, including at least one computer, wherein the at least one computer includes:

a path information database;

a path search unit that searches for an optimal path that exhibits a minimum travel cost borne by the moving object, from among travel paths of the moving object; and an output unit that outputs information regarding the optimal path from the path search unit, the path information database includes path network management information for managing a path network that is structured of a plurality of nodes indicating points through which the moving object is able to travel and a plurality of links that connect the plurality of nodes; and travel cost management information for managing travel costs, which are necessary to travel along each of the plurality of links by using each of the plurality of moving means, which can be used to travel along the plurality of links;

the plurality of nodes include a plurality of intersection nodes that can be reached by traveling along the plurality of links by using either a particular moving means or another moving means among the plurality of moving means;

the optimal path search method comprising:

a first step of determining, by the path search unit, a plurality of destination points which can be reached only by using the particular moving means on the path network, the destination points are nodes within the path network;

a second step of referencing, by the path search unit, the path information database to search for first travel paths, each for traveling from each of the destination points to each of the intersection nodes, and calculating a first travel cost that is necessary for the moving object to travel along each of the retrieved first travel paths;

a third step of searching, by the path search unit, for a nearest intersection node to each of the destination points, the nearest intersection node being one of the intersection nodes corresponding to the first travel path having the lowest calculated first travel cost;

the fourth step of generating pairs, each being obtained by associating each of the destination points with the nearest intersection node thereof;

the fifth step of generating a plurality of groups, each being a partial set of the path network including at least one destination point and one or two of the generated pairs of the destination point and the nearest intersection node thereof;

the sixth step of referencing the path information database to search for second travel paths within each of the groups along each of which the moving object travels through all of the destination points included in the group and one or two nearest intersection nodes included in the group, and calculating a second travel costs, each being necessary for the moving object to travel along each of the retrieved second travel paths;

the seventh step of determining one of the second travel paths for which the calculated second travel cost is minimum;

the eighth step of referencing the path information database to search for a third travel paths between groups along which the moving object travels between the groups, and calculating a third travel costs, each being necessary for the moving object to travel along each of the retrieved third travel paths;

the ninth step of determining one of the third travel paths for which the calculated third travel cost is minimum as an inter-group optimal path; and the tenth step of determine the optimal path based on the intra-group optimal path and the inter-group optimal path; and the output unit outputs data for displaying information regarding the optimal path and the travel paths of each of the plurality of moving means.

9. The optimal path search method according to claim 8, wherein:
the travel cost includes a travel time; and
the travel cost management information includes the travel time of each of the plurality of moving means that can travel along each of the plurality of links.

10. The optimal path search method according to claim 8, wherein, in the sixth step, searching for the second travel paths which connect a start point being one of the two nearest intersection nodes included in the group and an end point being the other of the two nearest nodes included in the group by passing through all of the destination points included in the group is performed.

11. The optimal path search method according to claim 10, wherein the start point and the end point are set to the identical nearest node.

12. The optimal path search method according to claim 10, wherein the fifth step includes the step of:
defining a first group;
referencing the path information database to search for the intra-group optimal path within the first group, and calculating a fourth travel cost that is necessary for the moving object to travel along the intra-group optimal path within the first group;
referencing, assuming that the first group is divided into a second group and a third group, the path information database to search for the intra-group optimal path within each of the second group and the third group, and calculating a fifth travel cost that is necessary for the moving object to travel along the intra-group optimal path within the second group and a sixth travel cost that is necessary for the moving object to travel along the intra-group optimal path within the third group;
referencing the path information database to search for the inter-group optimal path between the second group and the third group, and calculating an seventh travel cost that is necessary for the moving object to travel along the inter-group optimal path;
comparing a total value of the fifth travel cost, the seventh travel cost, and the seventh travel cost with a value of the fourth travel cost; and
dividing the first group into the second group and the third group in a case where it is judged that the total value of the fifth travel cost, the seventh travel cost, and the seventh travel cost is lower than the value of the fourth travel cost.

13. The optimal path search method according to claim 10, wherein the ninth step includes the step of:
defining a first group and a second group;
referencing the path information database to search for the intra-group optimal path within the first group, and calculating a eighth travel cost that is necessary for the moving object to travel along the intra-group optimal path within the first group;
referencing the path information database to search for the intra-group optimal path within the second group, and calculating a ninth travel cost that is necessary for the moving object to travel along the intra-group optimal path within the second group;
referencing the path information database to search for the inter-group optimal path between the first group and the second group, and calculating an tenth travel cost that is necessary for the moving object to travel along the retrieved inter-group optimal path;
referencing, assuming that the first group and the second group are combined to generate a third group, the path information database to search for the intra-group optimal path within the third group, and calculating a eleventh travel cost that is necessary for the moving object to travel along the intra-group optimal path within the third group;
comparing a value of the tenth travel cost with a total value of the ninth travel cost, the ninth travel cost, and the tenth travel cost; and
combining the first group and the second group to generate the third group in a case where it is judged that the value of the twelfth travel cost is lower than the total value of the eighth travel cost, the ninth travel cost, and the tenth travel cost.

14. The optimal path search method according to claim 8, wherein the first step includes:
referencing the path information database to extract loops which include a road among partial loops within the path network; and
determining the nodes on one of the extracted loop that form another one of the extracted loop as the points.

* * * * *